(12) United States Patent
Hunt et al.

(10) Patent No.: US 7,669,235 B2
(45) Date of Patent: Feb. 23, 2010

(54) SECURE DOMAIN JOIN FOR COMPUTING DEVICES

(75) Inventors: Galen C. Hunt, Bellevue, WA (US); Jeff Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

(21) Appl. No.: 10/853,931

(22) Filed: May 25, 2004

(65) Prior Publication Data

US 2005/0246771 A1 Nov. 3, 2005

Related U.S. Application Data

(63) Continuation of application No. 10/837,419, filed on Apr. 30, 2004.

(51) Int. Cl.
*G06F 21/00* (2006.01)
(52) U.S. Cl. ....................................................... 726/18
(58) Field of Classification Search ................ 713/172, 713/175; 726/6, 18, 19
See application file for complete search history.

(56) References Cited

U.S. PATENT DOCUMENTS

| | | | |
|---|---|---|---|
| 4,200,770 A | 4/1980 | Hellman et al. |
| 4,218,582 A | 8/1980 | Hellman et al. |
| 4,405,829 A | 9/1983 | Rivest et al. |
| 4,424,414 A | 1/1984 | Hellman et al. |
| 5,031,089 A | 7/1991 | Liu et al. |
| 5,115,505 A | 5/1992 | Bishop et al. |
| 5,220,621 A | 6/1993 | Saitoh |
| 5,430,810 A | 7/1995 | Saeki |
| 5,490,276 A | 2/1996 | Doli, Jr. et al. |
| 5,499,357 A | 3/1996 | Sonty et al. |
| 5,504,921 A | 4/1996 | Dev et al. |
| 5,557,774 A | 9/1996 | Shimabukuro et al. |
| 5,579,482 A | 11/1996 | Einkauf et al. |
| 5,668,995 A | 9/1997 | Bhat |
| 5,686,940 A | 11/1997 | Kuga |
| 5,748,958 A | 5/1998 | Badovinatz et al. |

(Continued)

FOREIGN PATENT DOCUMENTS

CN 1368694 9/2002

(Continued)

OTHER PUBLICATIONS

Clifford, Kahn, "Report on DIMAC Workshop on Trust Management" Online!, Mar. 10, 2003, Retrieved from the Internet: URL: http://web.archive.ort/web/20030310045643/http://ieee-security.org/Cipher/ConfReports/conf-rep-DIMACst.html>, pp. 2-3.

(Continued)

*Primary Examiner*—Gilberto Barron, Jr.
*Assistant Examiner*—Samson B Lemma
(74) *Attorney, Agent, or Firm*—Lee & Hayes, PLLC

(57) ABSTRACT

A technique is provided for acquiring security domain access credentials on a computing device. The security domain access credentials are acquired by storing a persistent identity on the computing device, and deriving data that includes the security domain access credentials from the persistent identity. The derived data is transferred to a security domain to allow the computing device to join the security domain.

15 Claims, 14 Drawing Sheets

U.S. PATENT DOCUMENTS

| | | |
|---|---|---|
| 5,758,351 A | 5/1998 | Gibson et al. |
| 5,768,271 A | 6/1998 | Seid et al. |
| 5,774,660 A | 6/1998 | Brendel et al. |
| 5,774,689 A | 6/1998 | Curtis et al. |
| 5,784,463 A | 7/1998 | Chen et al. |
| 5,790,895 A | 8/1998 | Krontz et al. |
| 5,801,970 A | 9/1998 | Rowland et al. |
| 5,802,590 A | 9/1998 | Draves |
| 5,815,574 A | 9/1998 | Fortinsky |
| 5,818,937 A | 10/1998 | Watson et al. |
| 5,822,531 A | 10/1998 | Gorczyca et al. |
| 5,826,015 A | 10/1998 | Schmidt |
| 5,845,124 A | 12/1998 | Berman |
| 5,845,277 A | 12/1998 | Pfeil et al. |
| 5,867,706 A | 2/1999 | Martin et al. |
| 5,878,220 A | 3/1999 | Olkin et al. |
| 5,895,499 A | 4/1999 | Chu |
| 5,905,728 A | 5/1999 | Han et al. |
| 5,917,730 A | 6/1999 | Rittie et al. |
| 5,958,009 A | 9/1999 | Friedrich et al. |
| 5,960,371 A | 9/1999 | Saito et al. |
| 5,968,126 A | 10/1999 | Ekstrom et al. |
| 6,012,113 A | 1/2000 | Tuckner |
| 6,035,405 A | 3/2000 | Gage et al. |
| 6,041,054 A | 3/2000 | Westberg |
| 6,047,323 A | 4/2000 | Krause |
| 6,047,325 A | 4/2000 | Jain et al. |
| 6,049,528 A | 4/2000 | Hendel et al. |
| 6,052,469 A | 4/2000 | Johnson et al. |
| 6,059,842 A | 5/2000 | Dumarot et al. |
| 6,065,058 A | 5/2000 | Hailpern et al. |
| 6,073,183 A | 6/2000 | Slonim |
| 6,073,227 A | 6/2000 | Abily et al. |
| 6,075,776 A | 6/2000 | Tanimoto et al. |
| 6,076,108 A | 6/2000 | Courts et al. |
| 6,081,826 A | 6/2000 | Masuoka et al. |
| 6,085,238 A | 7/2000 | Yuasa et al. |
| 6,086,618 A | 7/2000 | Al-Hilali et al. |
| 6,097,818 A | 8/2000 | Saito |
| 6,108,702 A | 8/2000 | Wood |
| 6,112,243 A | 8/2000 | Downs et al. |
| 6,115,393 A | 9/2000 | Engel et al. |
| 6,118,785 A | 9/2000 | Araujo et al. |
| 6,125,442 A | 9/2000 | Maves et al. |
| 6,125,447 A | 9/2000 | Gong |
| 6,134,594 A | 10/2000 | Helland et al. |
| 6,144,959 A * | 11/2000 | Anderson et al. ............... 707/9 |
| 6,147,995 A | 11/2000 | Dobbins et al. |
| 6,151,688 A | 11/2000 | Wipfel et al. |
| 6,167,052 A | 12/2000 | McNeill et al. |
| 6,167,383 A | 12/2000 | Henson |
| 6,167,515 A | 12/2000 | Lin |
| 6,178,529 B1 | 1/2001 | Short et al. |
| 6,182,275 B1 | 1/2001 | Beelitz et al. |
| 6,185,308 B1 | 2/2001 | Ando et al. |
| 6,192,401 B1 | 2/2001 | Modiri et al. |
| 6,195,091 B1 | 2/2001 | Harple et al. |
| 6,195,355 B1 | 2/2001 | Demizu |
| 6,208,345 B1 | 3/2001 | Sheard et al. |
| 6,208,649 B1 | 3/2001 | Kloth |
| 6,212,559 B1 | 4/2001 | Bixler et al. |
| 6,215,877 B1 | 4/2001 | Matsumoto |
| 6,215,878 B1 | 4/2001 | Harkins |
| 6,226,788 B1 | 5/2001 | Schoening et al. |
| 6,230,312 B1 | 5/2001 | Hunt |
| 6,233,610 B1 | 5/2001 | Hayball et al. |
| 6,236,365 B1 | 5/2001 | LeBlanc et al. |
| 6,236,729 B1 | 5/2001 | Takaragi et al. |
| 6,236,901 B1 | 5/2001 | Goss |
| 6,253,230 B1 | 6/2001 | Couland et al. |
| 6,256,773 B1 | 7/2001 | Bowman-Amuah |
| 6,263,089 B1 | 7/2001 | Otsuka et al. |
| 6,266,707 B1 | 7/2001 | Boden et al. |
| 6,269,076 B1 | 7/2001 | Shamir et al. |
| 6,269,079 B1 | 7/2001 | Marin et al. |
| 6,311,144 B1 | 10/2001 | Abu El Ata |
| 6,311,270 B1 | 10/2001 | Challener et al. |
| 6,327,622 B1 | 12/2001 | Jindal et al. |
| 6,330,605 B1 | 12/2001 | Christensen et al. |
| 6,336,138 B1 | 1/2002 | Caswell et al. |
| 6,336,171 B1 | 1/2002 | Coskrey, IV |
| 6,338,112 B1 | 1/2002 | Wipfel et al. |
| 6,351,685 B1 | 2/2002 | Dimitri et al. |
| 6,353,861 B1 | 3/2002 | Dolin, Jr. et al. |
| 6,353,898 B1 | 3/2002 | Wipfel et al. |
| 6,360,265 B1 | 3/2002 | Falck et al. |
| 6,366,578 B1 | 4/2002 | Johnson |
| 6,367,010 B1 | 4/2002 | Venkatram et al. |
| 6,370,573 B1 | 4/2002 | Bowman-Amuah |
| 6,370,584 B1 | 4/2002 | Bestavros et al. |
| 6,377,996 B1 | 4/2002 | Lumelsky et al. |
| 6,389,464 B1 | 5/2002 | Krishnamurthy et al. |
| 6,393,386 B1 | 5/2002 | Zager et al. |
| 6,393,456 B1 | 5/2002 | Ambler et al. |
| 6,408,390 B1 | 6/2002 | Saito |
| 6,424,718 B1 | 7/2002 | Holloway |
| 6,424,992 B2 | 7/2002 | Devarakonda et al. |
| 6,427,163 B1 | 7/2002 | Arendt et al. |
| 6,427,171 B1 | 7/2002 | Craft et al. |
| 6,442,557 B1 | 8/2002 | Buteau et al. |
| 6,442,713 B1 | 8/2002 | Block et al. |
| 6,449,650 B1 | 9/2002 | Westfall et al. |
| 6,457,048 B2 | 9/2002 | Sondur et al. |
| 6,463,536 B2 | 10/2002 | Saito |
| 6,470,025 B1 | 10/2002 | Wilson et al. |
| 6,470,464 B2 | 10/2002 | Bertram et al. |
| 6,473,791 B1 | 10/2002 | Al-Ghosein et al. |
| 6,480,955 B1 | 11/2002 | DeKoning et al. |
| 6,484,261 B1 | 11/2002 | Wiegel |
| 6,502,131 B1 | 12/2002 | Vaid et al. |
| 6,505,244 B1 | 1/2003 | Natarajan et al. |
| 6,519,615 B1 | 2/2003 | Wollrath et al. |
| 6,529,953 B1 | 3/2003 | Van Renesse |
| 6,539,494 B1 | 3/2003 | Abramson et al. |
| 6,546,423 B1 | 4/2003 | Dutta et al. |
| 6,549,516 B1 | 4/2003 | Albert et al. |
| 6,549,934 B1 | 4/2003 | Peterson et al. |
| 6,564,261 B1 | 5/2003 | Gudjonsson et al. |
| 6,570,847 B1 | 5/2003 | Hosein |
| 6,570,875 B1 | 5/2003 | Hegde |
| 6,574,195 B2 | 6/2003 | Roberts |
| 6,578,144 B1 | 6/2003 | Gennaro et al. |
| 6,584,499 B1 | 6/2003 | Jantz et al. |
| 6,587,876 B1 | 7/2003 | Mahon et al. |
| 6,598,077 B2 | 7/2003 | Primak et al. |
| 6,598,173 B1 | 7/2003 | Sheikh et al. |
| 6,598,223 B1 | 7/2003 | Vrhel, Jr. et al. |
| 6,601,101 B1 | 7/2003 | Lee et al. |
| 6,606,708 B1 | 8/2003 | Devine et al. |
| 6,609,148 B1 | 8/2003 | Salo et al. |
| 6,609,213 B1 | 8/2003 | Nguyen et al. |
| 6,611,522 B1 | 8/2003 | Zheng et al. |
| 6,628,671 B1 | 9/2003 | Dynarski et al. |
| 6,631,141 B1 | 10/2003 | Kumar et al. |
| 6,640,303 B1 | 10/2003 | Vu |
| 6,651,101 B1 | 11/2003 | Gai et al. |
| 6,654,782 B1 | 11/2003 | O'Brien et al. |
| 6,654,796 B1 | 11/2003 | Slater et al. |
| 6,665,714 B1 | 12/2003 | Blumenau et al. |
| 6,671,699 B1 | 12/2003 | Black et al. |
| 6,675,308 B1 | 1/2004 | Thomsen |
| 6,678,821 B1 | 1/2004 | Waugh et al. |
| 6,678,835 B1 | 1/2004 | Shah et al. |
| 6,681,262 B1 | 1/2004 | Rimmer |

| Patent No. | Type | Date | Inventor(s) |
|---|---|---|---|
| 6,691,148 | B1 | 2/2004 | Zinky et al. |
| 6,691,168 | B1 | 2/2004 | Bal et al. |
| 6,694,436 | B1 | 2/2004 | Audebert |
| 6,701,363 | B1 | 3/2004 | Chiu et al. |
| 6,717,949 | B1 | 4/2004 | Boden et al. |
| 6,718,361 | B1 | 4/2004 | Basani et al. |
| 6,718,379 | B1 | 4/2004 | Krishna et al. |
| 6,725,253 | B1 | 4/2004 | Okano et al. |
| 6,728,885 | B1 | 4/2004 | Taylor et al. |
| 6,735,596 | B2 | 5/2004 | Corynen |
| 6,738,736 | B1 | 5/2004 | Bond |
| 6,741,266 | B1 | 5/2004 | Kamiwada et al. |
| 6,742,020 | B1 | 5/2004 | Dimitroff et al. |
| 6,748,447 | B1 | 6/2004 | Basani et al. |
| 6,754,716 | B1 | 6/2004 | Sharma et al. |
| 6,754,816 | B1 | 6/2004 | Layton et al. |
| 6,757,744 | B1 | 6/2004 | Narisi et al. |
| 6,760,765 | B1 | 7/2004 | Asai et al. |
| 6,769,008 | B1 | 7/2004 | Kumar et al. |
| 6,769,060 | B1 | 7/2004 | Dent et al. |
| 6,772,333 | B1 | 8/2004 | Brendel |
| 6,779,016 | B1 | 8/2004 | Aziz et al. |
| 6,782,408 | B1 | 8/2004 | Chandra et al. |
| 6,789,090 | B1 | 9/2004 | Miyake et al. |
| 6,801,528 | B2 | 10/2004 | Nassar |
| 6,801,937 | B1 | 10/2004 | Novaes et al. |
| 6,804,783 | B1 | 10/2004 | Wesinger et al. |
| 6,816,897 | B2 | 11/2004 | McGuire |
| 6,820,121 | B1 | 11/2004 | Callis et al. |
| 6,823,299 | B1 | 11/2004 | Contreras et al. |
| 6,823,373 | B1 | 11/2004 | Pancha et al. |
| 6,823,382 | B2 | 11/2004 | Stone |
| 6,829,639 | B1 | 12/2004 | Lawson et al. |
| 6,829,770 | B1 | 12/2004 | Hinson et al. |
| 6,836,750 | B2 | 12/2004 | Wong et al. |
| 6,845,160 | B1 | 1/2005 | Aoki |
| 6,853,841 | B1 | 2/2005 | St. Pierre |
| 6,854,069 | B2 | 2/2005 | Kampe et al. |
| 6,856,591 | B1 | 2/2005 | Ma et al. |
| 6,862,613 | B1 | 3/2005 | Kumar et al. |
| 6,868,062 | B1 | 3/2005 | Yadav et al. |
| 6,868,454 | B1 | 3/2005 | Kubota et al. |
| 6,880,002 | B2 | 4/2005 | Hirschfeld et al. |
| 6,886,038 | B1 | 4/2005 | Tabbara et al. |
| 6,888,807 | B2 | 5/2005 | Heller et al. |
| 6,895,534 | B2 | 5/2005 | Wong et al. |
| 6,898,791 | B1 | 5/2005 | Chandy et al. |
| 6,904,458 | B1 | 6/2005 | Bishop et al. |
| 6,907,395 | B1 | 6/2005 | Hunt et al. |
| 6,915,338 | B1 | 7/2005 | Hunt et al. |
| 6,922,791 | B2 | 7/2005 | Mashayekhi et al. |
| 6,928,482 | B1 | 8/2005 | Ben Nun et al. |
| 6,947,987 | B2 | 9/2005 | Boland |
| 6,957,186 | B1 | 10/2005 | Guheen et al. |
| 6,963,981 | B1 | 11/2005 | Bailey et al. |
| 6,968,291 | B1 | 11/2005 | Desai |
| 6,971,063 | B1 | 11/2005 | Rappaport et al. |
| 6,971,072 | B1 | 11/2005 | Stein |
| 6,973,620 | B2 | 12/2005 | Gusler et al. |
| 6,973,622 | B1 | 12/2005 | Rappaport et al. |
| 6,976,079 | B1 | 12/2005 | Ferguson et al. |
| 6,976,269 | B1 | 12/2005 | Avery, IV et al. |
| 6,983,317 | B1 | 1/2006 | Bishop et al. |
| 6,985,956 | B2 | 1/2006 | Luke et al. |
| 6,990,666 | B2 | 1/2006 | Hirschfeld et al. |
| 7,003,562 | B2 | 2/2006 | Mayer |
| 7,003,574 | B1 | 2/2006 | Bahl |
| 7,012,919 | B1 | 3/2006 | So et al. |
| 7,013,462 | B2 | 3/2006 | Zara et al. |
| 7,016,950 | B2 | 3/2006 | Tabbara et al. |
| 7,024,451 | B2 | 4/2006 | Jorgenson |
| 7,027,412 | B1 | 4/2006 | Miyamoto et al. |
| 7,028,228 | B1 | 4/2006 | Lovy et al. |
| 7,035,786 | B1 | 4/2006 | Abu El Ata et al. |
| 7,035,930 | B2 | 4/2006 | Graupner et al. |
| 7,043,545 | B2 | 5/2006 | Tabbara et al. |
| 7,046,680 | B1 | 5/2006 | McDysan et al. |
| 7,050,961 | B1 | 5/2006 | Lee et al. |
| 7,054,943 | B1 | 5/2006 | Goldszmidt et al. |
| 7,058,704 | B1 | 6/2006 | Mangipudi et al. |
| 7,058,826 | B2 | 6/2006 | Fung |
| 7,058,858 | B2 | 6/2006 | Wong et al. |
| 7,062,718 | B2 | 6/2006 | Kodosky et al. |
| 7,069,480 | B1 | 6/2006 | Lovy et al. |
| 7,069,553 | B2 | 6/2006 | Narayanaswamy et al. |
| 7,072,807 | B2 | 7/2006 | Brown et al. |
| 7,072,822 | B2 | 7/2006 | Humenansky et al. |
| 7,076,633 | B2 | 7/2006 | Tormasov et al. |
| 7,080,143 | B2 | 7/2006 | Hunt et al. |
| 7,082,464 | B2 | 7/2006 | Hasan et al. |
| 7,089,281 | B1 | 8/2006 | Kazemi et al. |
| 7,089,293 | B2 | 8/2006 | Grosner et al. |
| 7,089,530 | B1 | 8/2006 | Dardinski et al. |
| 7,093,005 | B2 | 8/2006 | Patterson |
| 7,093,288 | B1 | 8/2006 | Hydrie et al. |
| 7,096,258 | B2 | 8/2006 | Hunt et al. |
| 7,099,936 | B2 | 8/2006 | Chase et al. |
| 7,103,185 | B1 | 9/2006 | Srivastava et al. |
| 7,113,900 | B1 | 9/2006 | Hunt et al. |
| 7,117,158 | B2 | 10/2006 | Weldon et al. |
| 7,117,261 | B2 | 10/2006 | Kryskow, Jr. et al. |
| 7,120,154 | B2 | 10/2006 | Bavant et al. |
| 7,124,289 | B1 | 10/2006 | Suorsa |
| 7,127,625 | B2 | 10/2006 | Farkas et al. |
| 7,131,123 | B2 | 10/2006 | Suorsa et al. |
| 7,134,011 | B2 | 11/2006 | Fung |
| 7,134,122 | B1 | 11/2006 | Sero et al. |
| 7,139,930 | B2 | 11/2006 | Mashayekhi et al. |
| 7,143,420 | B2 | 11/2006 | Radhakrishnan |
| 7,146,353 | B2 | 12/2006 | Garg et al. |
| 7,150,015 | B2 | 12/2006 | Pace et al. |
| 7,152,109 | B2 | 12/2006 | Suorsa et al. |
| 7,152,157 | B2 | 12/2006 | Murphy et al. |
| 7,155,380 | B2 | 12/2006 | Hunt et al. |
| 7,162,427 | B1 | 1/2007 | Myrick et al. |
| 7,162,509 | B2 | 1/2007 | Brown et al. |
| 7,174,379 | B2 | 2/2007 | Agarwal et al. |
| 7,191,344 | B2 | 3/2007 | Lin et al. |
| 7,194,439 | B2 | 3/2007 | Kassan et al. |
| 7,194,616 | B2 | 3/2007 | Axnix et al. |
| 7,200,530 | B2 | 4/2007 | Brown et al. |
| 7,200,655 | B2 | 4/2007 | Hunt et al. |
| 7,203,911 | B2 | 4/2007 | Williams |
| 7,213,231 | B1 | 5/2007 | Bandhole et al. |
| 7,222,147 | B1 | 5/2007 | Black et al. |
| 7,225,441 | B2 | 5/2007 | Kozuch et al. |
| 7,231,410 | B1 | 6/2007 | Walsh et al. |
| 7,254,634 | B1 | 8/2007 | Davis et al. |
| 7,257,584 | B2 | 8/2007 | Hirschfeld et al. |
| 7,275,156 | B2 * | 9/2007 | Balfanz et al. ............... 713/168 |
| 7,278,273 | B1 | 10/2007 | Whitted et al. |
| 7,281,154 | B2 | 10/2007 | Mashayekhi et al. |
| 7,302,608 | B1 | 11/2007 | Acharya et al. |
| 7,305,549 | B2 | 12/2007 | Hunt et al. |
| 7,305,561 | B2 | 12/2007 | Hunt et al. |
| 7,313,573 | B2 | 12/2007 | Leung et al. |
| 7,315,801 | B1 | 1/2008 | Dowd et al. |
| 7,333,000 | B2 | 2/2008 | Vassallo |
| 7,349,891 | B2 | 3/2008 | Charron et al. |
| 7,350,068 | B2 | 3/2008 | Anderson et al. |
| 7,350,186 | B2 | 3/2008 | Coleman et al. |
| 7,366,755 | B1 | 4/2008 | Cuomo et al. |
| 7,367,028 | B2 | 4/2008 | Kodosky et al. |
| 7,370,103 | B2 | 5/2008 | Hunt et al. |
| 7,376,125 | B1 | 5/2008 | Hussain et al. |
| 7,379,982 | B2 | 5/2008 | Tabbara |

| | | |
|---|---|---|
| 7,386,721 B1 * | 6/2008 | Vilhuber et al. ............. 713/156 |
| 7,395,320 B2 | 7/2008 | Hunt et al. |
| 7,406,517 B2 | 7/2008 | Hunt et al. |
| 7,464,147 B1 | 12/2008 | Fakhouri et al. |
| 2001/0014158 A1 | 8/2001 | Baltzley |
| 2001/0016909 A1 | 8/2001 | Gehrmann |
| 2001/0019554 A1 | 9/2001 | Nomura et al. |
| 2001/0020228 A1 | 9/2001 | Cantu et al. |
| 2001/0039586 A1 | 11/2001 | Primak et al. |
| 2001/0047400 A1 | 11/2001 | Coates et al. |
| 2002/0009079 A1 | 1/2002 | Jungck et al. |
| 2002/0010771 A1 | 1/2002 | Mandato |
| 2002/0022952 A1 | 2/2002 | Zager et al. |
| 2002/0038421 A1 | 3/2002 | Hamada |
| 2002/0040402 A1 | 4/2002 | Levy-Abegnoli et al. |
| 2002/0049573 A1 | 4/2002 | El Ata |
| 2002/0057684 A1 | 5/2002 | Miyamoto et al. |
| 2002/0069267 A1 | 6/2002 | Thiele |
| 2002/0069369 A1 | 6/2002 | Tremain |
| 2002/0087264 A1 | 7/2002 | Hills et al. |
| 2002/0090089 A1 | 7/2002 | Branigan |
| 2002/0120761 A1 | 8/2002 | Berg |
| 2002/0131601 A1 | 9/2002 | Ninomiya |
| 2002/0138551 A1 | 9/2002 | Erickson |
| 2002/0152086 A1 | 10/2002 | Smith et al. |
| 2002/0156900 A1 | 10/2002 | Marquette et al. |
| 2002/0161839 A1 | 10/2002 | Colasurdo et al. |
| 2002/0171690 A1 | 11/2002 | Fox et al. |
| 2002/0194342 A1 | 12/2002 | Lu et al. |
| 2002/0194345 A1 | 12/2002 | Lu et al. |
| 2002/0194369 A1 | 12/2002 | Rawlings et al. |
| 2002/0198995 A1 | 12/2002 | Liu et al. |
| 2003/0008712 A1 | 1/2003 | Poulin |
| 2003/0009559 A1 | 1/2003 | Ikeda |
| 2003/0014644 A1 | 1/2003 | Burns et al. |
| 2003/0028770 A1 | 2/2003 | Litwin |
| 2003/0041142 A1 | 2/2003 | Zhang et al. |
| 2003/0041159 A1 | 2/2003 | Tinsley et al. |
| 2003/0046615 A1 | 3/2003 | Stone |
| 2003/0051049 A1 | 3/2003 | Noy et al. |
| 2003/0056063 A1 | 3/2003 | Hochmuth et al. |
| 2003/0065743 A1 | 4/2003 | Jenny et al. |
| 2003/0069369 A1 | 4/2003 | Belenkaya et al. |
| 2003/0074395 A1 | 4/2003 | Eshghi et al. |
| 2003/0101284 A1 | 5/2003 | Cabrera et al. |
| 2003/0105963 A1 | 6/2003 | Slick et al. |
| 2003/0120763 A1 | 6/2003 | Voilpano |
| 2003/0126464 A1 | 7/2003 | McDaniel et al. |
| 2003/0130833 A1 | 7/2003 | Brownell et al. |
| 2003/0165140 A1 | 9/2003 | Tang et al. |
| 2003/0204734 A1 * | 10/2003 | Wheeler ..................... 713/184 |
| 2003/0206548 A1 | 11/2003 | Bannai et al. |
| 2003/0214908 A1 | 11/2003 | Kumar et al. |
| 2003/0217263 A1 | 11/2003 | Sakai |
| 2003/0225563 A1 | 12/2003 | Gonos |
| 2004/0002878 A1 | 1/2004 | Maria Hinton |
| 2004/0054791 A1 | 3/2004 | Chakraborty et al. |
| 2004/0068631 A1 | 4/2004 | Ukeda et al. |
| 2004/0073443 A1 | 4/2004 | Gabrick et al. |
| 2004/0073795 A1 | 4/2004 | Jablon |
| 2004/0078787 A1 | 4/2004 | Borek et al. |
| 2004/0111315 A1 | 6/2004 | Sharma et al. |
| 2004/0117438 A1 | 6/2004 | Considine et al. |
| 2004/0117476 A1 | 6/2004 | Steele et al. |
| 2004/0160386 A1 | 8/2004 | Michelitsch et al. |
| 2004/0161111 A1 | 8/2004 | Sherman |
| 2004/0193388 A1 | 9/2004 | Outhred et al. |
| 2004/0199572 A1 | 10/2004 | Hunt et al. |
| 2004/0205179 A1 | 10/2004 | Hunt et al. |
| 2004/0226010 A1 | 11/2004 | Suorsa |
| 2004/0261079 A1 | 12/2004 | Sen |
| 2004/0264481 A1 | 12/2004 | Darling et al. |
| 2004/0267920 A1 | 12/2004 | Hydrie et al. |
| 2004/0268357 A1 | 12/2004 | Joy et al. |
| 2004/0268358 A1 | 12/2004 | Darling et al. |
| 2005/0008001 A1 | 1/2005 | Williams et al. |
| 2005/0021742 A1 | 1/2005 | Yemini et al. |
| 2005/0055435 A1 | 3/2005 | Gbadegesin et al. |
| 2005/0080811 A1 | 4/2005 | Speeter et al. |
| 2005/0086502 A1 | 4/2005 | Rayes et al. |
| 2005/0091078 A1 | 4/2005 | Hunt et al. |
| 2005/0091227 A1 | 4/2005 | McCollum et al. |
| 2005/0097097 A1 | 5/2005 | Hunt et al. |
| 2005/0097146 A1 | 5/2005 | Konstantinou et al. |
| 2005/0102388 A1 | 5/2005 | Tabbara et al. |
| 2005/0125212 A1 | 6/2005 | Hunt et al. |
| 2005/0138416 A1 | 6/2005 | Qian et al. |
| 2005/0152270 A1 | 7/2005 | Gomez Paredes et al. |
| 2005/0192971 A1 | 9/2005 | Tabbara et al. |
| 2005/0193103 A1 | 9/2005 | Drabik |
| 2005/0246529 A1 | 11/2005 | Hunt et al. |
| 2005/0246771 A1 | 11/2005 | Hunt et al. |
| 2005/0251783 A1 | 11/2005 | Torone et al. |
| 2005/0257244 A1 | 11/2005 | Joly et al. |
| 2006/0025984 A1 | 2/2006 | Papaefstathiou et al. |
| 2006/0025985 A1 | 2/2006 | Vinberg et al. |
| 2006/0031248 A1 | 2/2006 | Vinberg et al. |
| 2006/0034263 A1 | 2/2006 | Outhred et al. |
| 2006/0037002 A1 | 2/2006 | Vinberg et al. |
| 2006/0048017 A1 | 3/2006 | Anerousis et al. |
| 2006/0123040 A1 | 6/2006 | McCarthy et al. |
| 2006/0149838 A1 | 7/2006 | Hunt et al. |
| 2006/0155708 A1 | 7/2006 | Brown et al. |
| 2006/0161879 A1 | 7/2006 | Lubrecht et al. |
| 2006/0161884 A1 | 7/2006 | Lubrecht et al. |
| 2006/0235664 A1 | 10/2006 | Vinberg et al. |
| 2006/0259609 A1 | 11/2006 | Hunt et al. |
| 2006/0259610 A1 | 11/2006 | Hunt et al. |
| 2006/0271341 A1 | 11/2006 | Brown et al. |
| 2007/0006177 A1 | 1/2007 | Aiber et al. |
| 2007/0112847 A1 | 5/2007 | Dublish et al. |
| 2007/0192769 A1 | 8/2007 | Mimura et al. |
| 2008/0059214 A1 | 3/2008 | Vinberg et al. |

FOREIGN PATENT DOCUMENTS

| | | |
|---|---|---|
| CN | 1375685 | 10/2002 |
| EP | 1180886 A1 | 2/2002 |
| EP | 1307018 A1 | 5/2003 |
| JP | 8297567 | 11/1996 |
| JP | 11007407 | 12/1999 |
| JP | 11340980 A | 12/1999 |
| JP | 2000293497 A | 10/2000 |
| JP | 2001339437 A | 12/2001 |
| JP | 2001526814 | 12/2001 |
| JP | 2002084302 | 3/2002 |
| JP | 2002354006 A | 12/2002 |
| JP | 2003532784 | 11/2003 |
| JP | 2005155729 | 6/2005 |
| KR | 10-2002-0026751 | 4/2002 |
| KR | 10-2004-0008275 | 1/2004 |
| WO | WO9853410 | 11/1998 |
| WO | WO9930514 A2 | 6/1999 |
| WO | WO9963439 | 12/1999 |
| WO | WO0022526 | 4/2000 |
| WO | WO0031945 | 6/2000 |
| WO | WO0073929 | 12/2000 |
| WO | WO0230044 A2 | 4/2002 |
| WO | WO 0237748 | 5/2002 |
| WO | WO02085051 | 10/2002 |
| WO | WO03027876 A1 | 4/2003 |

WO    WO03039104    5/2003

OTHER PUBLICATIONS

Wen-Chen Wang, "How a SCVP client authenticates the SCVP server", Online! Sep. 12, 2003, Retrieved from the Internet: URL:http://www.imc.org/ietf-pkix/old-archive-03/msg01323.html>, p. 1.

Schneier, Bruce, "Applied Cryptography Protocols, Algorithms and Source Code in C, Second Edition", 1996, John Wiley & Sons, Inc., New York, p. 461, pp. 466-468, pp. 513-514.

"C.O.B.A.S Centralized Out-Of-Band Authentication System", QT Worldtel Inc., Sep. 8-9, 2003, pp. 14.

"Enhanced IP Services for Cisco Networks", retrieved on Jun. 19, 2007, at <<http://proquest.safaribooksonline.com/1578701066>>, Sep. 23, 1999, pp. 11.

"Pretty Good Privacy PGP for Personal Privacy, Version 5.0 For Windows 95 Windows NT", Pretty Good Privacy Inc., 1997, pp. 137.

Moore, D.A., "Network Interoperability Program", MILCOM 97 Proceedings, vol. 3, pp. 1152-1155, 1997.

Maughan et al., "Security Associations: Building Blocks for Secure Communications", IEEE—Symposium on Computers and Communications, pp. 157-163, 1995.

Araki, "Linux Security Diary, Use VLAN in Linux", Linux Japan, Itsutsubashi Research Co.,ltd., vol. 3, No. 11,Nov. 1, 2008, pp. 110-113 (CSDB: National Academy Paper 200300158009.

Bagrodia, et al., "A Scalable Distributed Middleware Service Architecture to Support Mobile Internet Applications," Wireless Networks V.9 N 4 Jul. 2003 Kluwer Academic Publishers Manufacturered int he Netherlands; pp. 311-320.

Burns, et al., "Allocation and Data Placement Using Virtual Contiguity", pp. 1-6.

Chao, "Next Generation Routers," Proceedings of the IEEE. vol. 90 No. 9 Sep. 2002.

Chen, et al., "Performance Prediction of Component-based Applications", available at least as early as Jan. 10, 2007, at <<http://www.ug.it.usyd.edu.au/~iango/papers/jss_paper_draft_0503.pdf>>, pp. 1-12.

Chunxiao, et al., Configure and move the e-Commerce Business Model by Utilizing XML, Applications of Computer Systems, No. 2, p. 8-11.

Dekhil, et al., "Generalized Policy Model for Application and Service Management", Hewlett-Packard Laboratories, Software Technology Lab, 3 pages.

Frolund, et al., "Design-Time Simulation of a Large-Scale, Distrubuted object System" ACM 1998, pp. 374-400.

Garschhammer, et al., "Towards generic Service Management Concepts A Service Model Based Approach", 14 pages.

Harbour, et al., "MAST An Open Environment for Modeling, Analysis, and Design of Real-Time Systems", available at least as early as Jan. 10, 2007, at <<http://citeseer.ist.psu.edu/cache/papers/cs/30959/http:zSzzSzwww.ctr.unican.eszSzpublicationszSzmgh-jlm-jjg-jcp-jmd-2002a.pdf/mast-an-open-environment.pdf>>, pp. 1-16.

Hardwick, et al., "Modeling the Performance of E-Commerce Site", Jan. 6, 2007, at <<http://www.cs.cmu.edu/~jch/publications/hardwick01modeling.html>>, Journal of Computer Resource Management, 2002, pp. 1-11.

Howard et al., "Designing Secure Web-Based Applications for Microsoft Windows 2000", 2000.

"Integrated Secrurity Management", OpenPMF(Policy Managment Framework), 2 pages.

Kounev, "A Capacity Planning Methodology for Distributed E-Commerce Applications", Jan. 2, 2001, pp. 1-13.

Liu et al., "Visualization in Network Topology Optimization", ACM, 1992, pp. 131-138.

Mahon, "OpenView PolicyXpert: Heterogeneous Configuration and Control", OpenView Policy-Based Network Management, Feb. 1999, 4 pages.

Miyamoto, et al., "VLAN Management System on Large-scale Network," Journal of Information Processing Society of Japan, vol. 41, No. 12, pp. 3234-3244, the Information Processing Society of Japan, Dec. 15, 2000. (CSDB: National Academy Paper 200200108005).

Nerurkar, "Security Analysis and Design", Dr. Dobb's Journal, Nov. 2000, pp. 50-56.

Nestor, "Security Modeling Using Hierarchical State Machines", IEEE 1991, pp. 110-119.

Norton, "Simalytic Hybrid Modeling Planning the Capacity of Client/Server Applications", available at least as early as Jan. 10, 2007, at <<http://citeseer.ist.psu.edu/cache/papers/cs/12830/http:zSzzSzwww.simalytic.comzSzRESUMEzSz..zSzIMACS97x.pdf/simalytic-hybrid-modeling-planning.pdf>>, Colorado Technical University, 1997, pp. 1-7.

Shi et al., "An Effective Model for Composition of Secure Systems", The Journal of Systems and Software, 1998, pp. 233-244.

Somers, "Hybrid: Unifying Centralised and Distributed Network Management using Intelligent Agents" IEEE Network Operations and Management Symposium Kyoto Apr. 15-19, 1996. pp. 34-43.

Sultan, et al., "Migratory TCP: Connection Migration for Service Continuity," in the Internet Proceedings 22nd Intl. Conference on Distributed Computing Systems; Jul. 2002; pp. 469-740.

Vadim, "On Virtual Data Centers and Their Operating Environments", at <<http://www.hpl.hp.com/techreports/2001/HPL-2001-44.html>>, Mar. 8, 2001, pp. 1-20.

Yuhui, e-Commerce Based on ERP for Enterprize by Utilizing DNA and XML, Computer Engineering, vol. 27, No. 6, p. 165,166,182.

Cardelli, L., "Type Systems," CRC Handbook of Computer Science and Engineering, 2nd Edition, Ch. 97, Wednesday, Feb. 25, 2004, 8:00pm CRC Press., http://research.microsoft.com/Users/luca/Papers/TypeSystems.pdf.

"Core Principles of the Dynamic Systems Initiative: Leveraging System Knowledge, Captured in Software Models, to Address Challenges Across the IT Life Cycle," Windows Server System, http://www.microsoft.com/windowsserversystem/dsi/dsicore.mspx.

Menezes, et al., "Handbook of Applied Cryptography", CRC Press, 1996, Chapters 8 & 12, pp. 283-319 and 489-541.

Iwasaki, Hideki "IP Troubles Q & A—The Prevention of Network Troubles and the Risk Management", Computer & Network LAN, Japan Ohmsha, Ltd., vol. 18, No. 8, (Jul. 14, 2000), pp. 29-39.

Translated copy of the Japanese Office Action mailed on Jan. 26, 2007 for Japanese Patent Application No. 2001-326848, a counterpart foreign application of US Patent No. 6,886,038.

Translated copy of the Japanese Office Action mailed on Dec. 14, 2007 for Japanese Patent Application No. 2001-326848, a counterpart foreign application of US Patent No. 6,886,038.

Kitjongthawonkul, S., et al., "Modeling Information Systems Using Objects, Agents, and Task-Based Problem Solving Adapters," Proc. 10th Australasian Conference on Information Systems, 1999, http://www.vuw.ac.nz/acis99/Papers/PaperKitjongthawonkul-077.pdf.

Meader, P., "Build Distributed Apps a New Way," VSLive!ShowDaily, San Francisco, Mar. 25, 2004, http://www.ftponline.com/reports/vslivesf/2004/whitehorse2/.

Meader, P., "Model Apps More Effectively," VSLive!ShowDaily, San Francisco, Mar. 24, 2004, http://www.ftponline.com/reports/vslivesf/2004/whitehorse/.

"System Definition Model," Windows Server System Home, http://www.microsoft.com/windowsserversystem/dsi/sdm.mspx.

"The Age Changed by Information Network and System: The Internet Releasing Enterprises and Society A? The New Century created by an E Service and a Terabit Network Service: Disappearance of Enterprise Servers, Service Components behind the Internet", Nikkei Internet Technology, Japan, Nikkei BUsiness Publications, Inc. No. 30, (Dec. 22, 1999), pp. 76-81.

Tofts, C., "HOLOS—A Simulation and Multi Mathematical Modelling Tool," Hewlett-Packard Company, 2001, http://www.hpl.hp.com/techreports/2001/HPL-2001-276.pdf.

PCT Search Report for PCT Application No. PCT/US2006/038856, mailed Feb. 20, 2007 (9 pages).

Office Action for Russian Application No. 2004117219, mailed on Oct. 6, 2008 (5 pages).

Official Notice of Rejection for Japanese Patent Application No. 2001-326848, mailed on Jan. 26, 2007 (3 pages).

\* cited by examiner

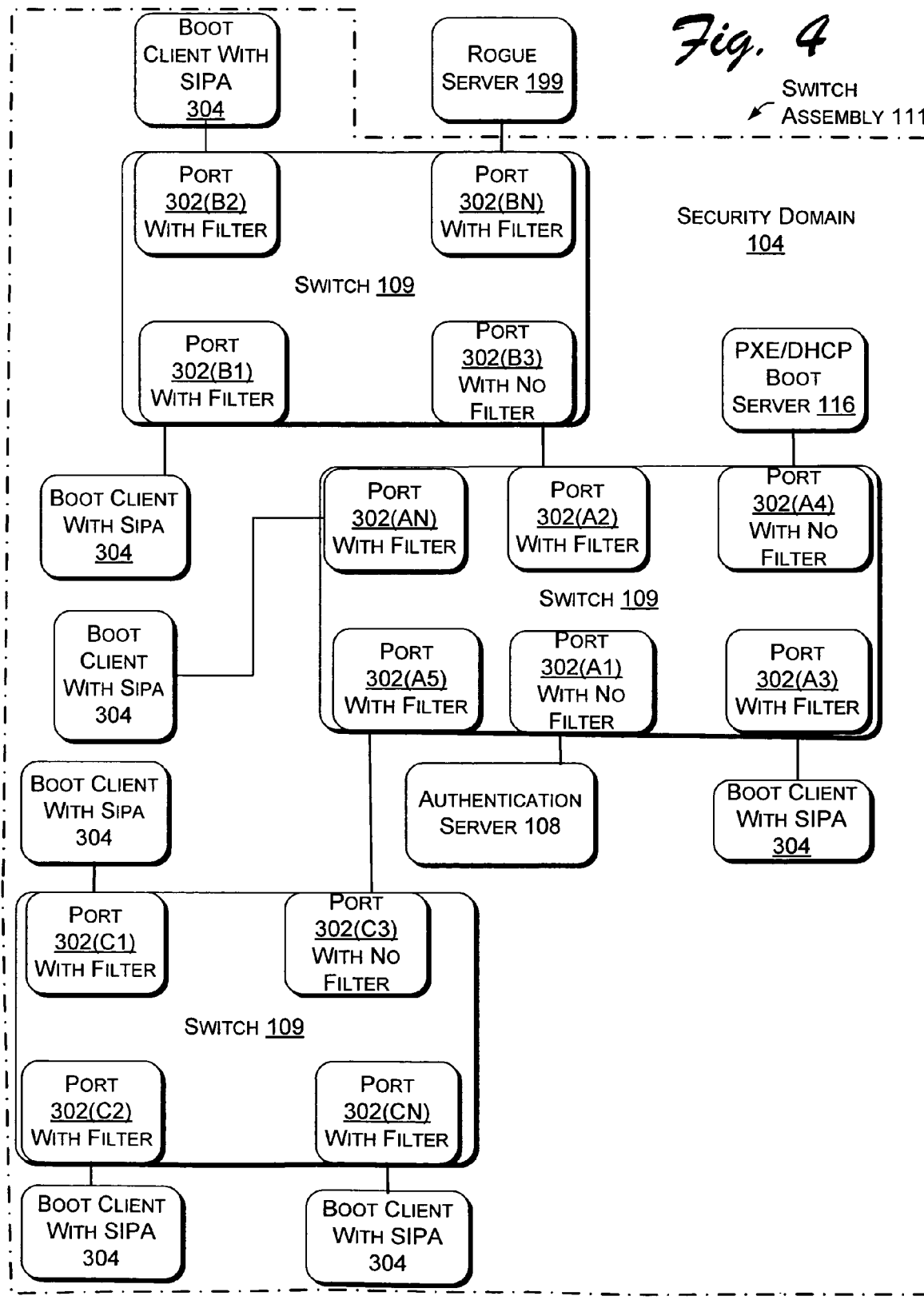

SECURE DOMAIN JOIN FOR COMPUTING DEVICES

This is a continuation of application Ser. No. 10/837,419, filed Apr. 30, 2004, entitled "Isolated Persistent Identity Storage For Authentication of Computing Devices" to inventors Hunt et al.

BACKGROUND

Authenticating a new computing device with respect to an existing network is challenging, labor intensive, and is often performed manually by sending a trusted employee to the location of the computing device. Typically, such authenticating is performed using a shared secret that is made available to the trusted employee. The trusted employee is then able to enter the shared secret when the new computing device is coupled to the network, and also possibly when re-configuring the computing device (e.g., when installing a new operating system). For security purposes, the reliability of the shared secret is only as good as the trust and reliability of the trusted employee because the trusted employee can disclose the shared secret to others either intentionally or accidentally.

Furthermore, sending a trusted employee to enter the shared secret to each computing device when it is added to the network or re-configured represents a time-consuming and expensive operation. As electronic commerce and other operations that demand greater security become more commonplace, increasing the reliability and simplicity of authentication of newly added and/or re-configured computing devices is desirable.

SUMMARY

This disclosure describes a technique for acquiring security domain access credentials on a computing device. The security domain access credentials are acquired by storing a persistent identity on the computing device, and deriving data that includes the security domain access credentials from the persistent identity. The derived data is transferred to a security domain to allow the computing device to join the security domain.

BRIEF DESCRIPTION OF THE DRAWINGS

The same numbers are used throughout the document to reference like components and/or features.

FIG. 4 is a block diagram of another embodiment of a switch assembly that is included in the security domain of FIGS. 1 and 2.

DETAILED DESCRIPTION

This disclosure describes a number of authentication techniques and devices that authenticate at least one computing device with respect to a security domain. The computing device is located outside of the security domain prior to the authentication. As a result of the authentication, the computing device joins the security domain. A secure identity processing area (SIPA) is included in each computing device, and each SIPA provides the authentication using a persistent identity. The SIPA does not require key information input from trusted individuals who are in conventional systems provided with information relating to cryptographic keys or certificates.

In one embodiment, a computing device having an unconfigured SIPA is placed in a staging area where the unconfigured SIPA is configured such that it can be disconnected from the staging area and then integrated within a production area where it can be authenticated with the security domain. In one embodiment, the SIPA largely automates the authentication process of computing devices joining the security domain.

Different aspects of the SIPA provide for a number of functions including but not limited to: persisting an identity, providing a secure bootstrap program to provide or update an operating system, and/or securely joining a security domain in a manner that requires no human intervention such as providing a shared secret or by the person entering a pin code that is used by the SIPA to generate a key pair. The operating system can have a number of configurations and require certain levels of authentication. Portions of the operating system, and associated application programs, may be resident at different times in the CPU 132, the memory 134, and/or other network or other locations. As such, the specific location or operation of the operating system is not further described, and is not shown in the figures. A number of types of operating system are produced and made commercially available by Microsoft. The SIPA further allows the computing device to be purposed or repurposed in a manner that mitigates spoofing threats such as exist with the conventional remote boot protocols.

Example SIPA Authentication with Respect to Security Domain

Figure 1:
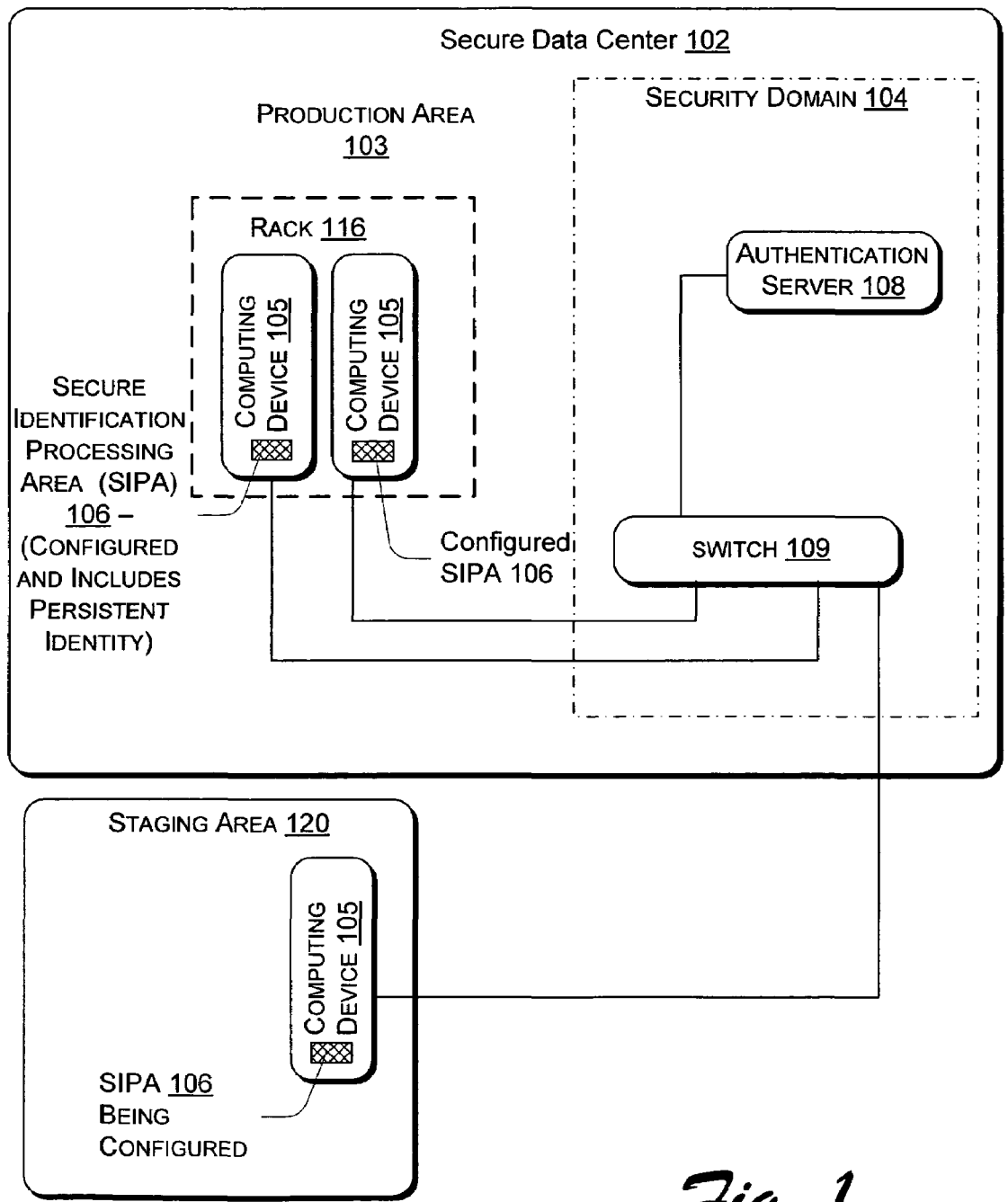
FIG. 1 is an illustrative architecture of a secure data center including a security domain and a number of computing devices, each computing device including a secure identity processing area (SIPA).
Figure 2:
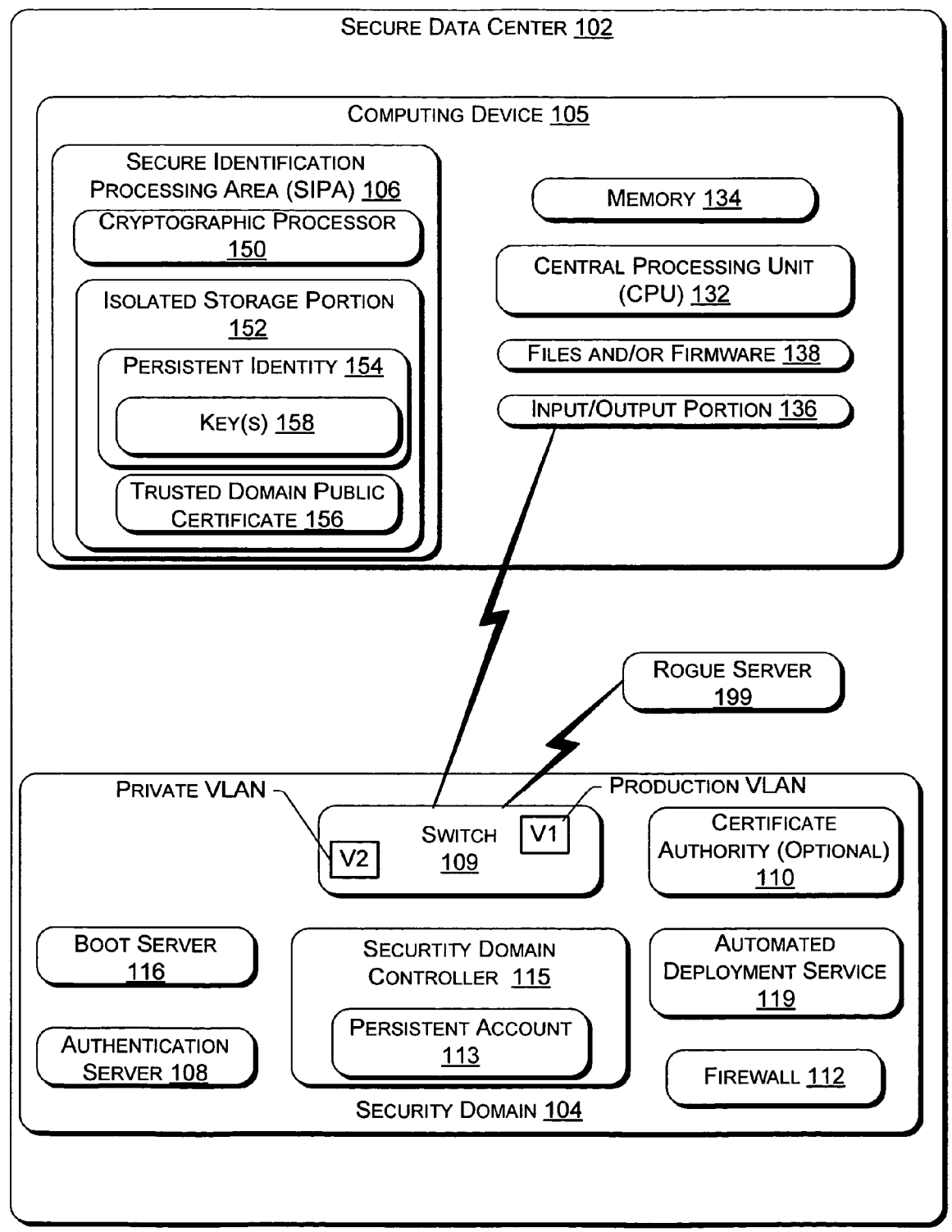
FIG. 2 is a more detailed example of a secure data center with a security domain and a computing device, the computing device including the SIPA.

FIGS. 1 and 2 each show a data center 102 having a security domain 104 and at least one computing device 105. Although FIG. 2 shows a single computing device 105 in order to avoid cluttering the drawings, a number of computing devices may be in communication with the security domain 104. The security domain 104 distinctly interfaces with each computing device 105 via ports located in one or more switches 109. While the computing devices in a production area 103 are shown as being distinct from the security domain 104 in FIG. 1, the act of a computing device joining the security domain results in a computing device such as a boot server 304 becoming a portion of the security domain as shown in FIG. 4. The switches 109 can be coupled to the computing devices 105 with wired and/or wireless couplings. Each computing device 105 includes a SIPA 106 that provides a number of authentication functions to allow the identity of the computing device 105 to be proven to the security domain 104.

Each computing device 105 can be any of a variety of types of computers including, but not limited to, desktop PCs, workstations, mainframe computers, server computers, client computers, Internet appliances, gaming consoles, handheld computers, cellular telephones, personal digital assistants (PDAs), etc. The multiple computing devices may have different purposes, hardware configurations, application programs, operating systems, software configurations, processors, manufacturers, etc.

The secure data center 102 includes a number of computing devices 105 that are within the production area 103. In one embodiment, each computing device joins the security domain 104 upon authentication. The computing devices 105 can be included in such embodiments of the secure data centers 102 as, for example, a data center such as an Internet data center (IDC), a server farm, a client computer, an office or business environment, a home environment, an educational or research facility, a retail or sales environment, etc.

Conventional server farms include a large number of computing devices 105 that are arranged as servers. Racks 116 within a protected building often support a number of computing devices in server farms. Individual computing devices 105 within the server farms are often referred to as "blades", due largely to their ability to slide into and out of the racks during positioning.

The components of the secure data center 102 provide authenticated interfacing between the computing devices 105 and the security domain 104. Certain hardware and software embodiments of the secure data center 102 provide for mutual authentication or one-way authentication between the SIPA 106 within the computing device 105 and the security domain 104 using an automated deployment service 119. Cryptographic functions as described in this disclosure can be provided using hardware, firmware, and/or software that are included in the SIPA 106.

The secure data center 102 of FIGS. 1 and 2 acts as an isolated secure boot system. During a secure boot of the computing device 105, the security domain 104 becomes associated with the SIPA 106 of the computing device 105. The association between the security domain 104 and the SIPA 106 provides cryptographic verification of the SIPA 106 to authenticate the computing device 105. The authentication occurs largely automatically within the secure data center, and in certain embodiments there is no human intervention and no human knowledge of private key information that is included in the SIPA 106.

The secure data center 102 can authenticate a computing device that is installing an operating system. The secure data center 102 allows a number of computing devices 105 to securely download at least a portion of their operating system from an automated deployment service 119 as shown in FIG. 2 that is located within the security domain 104, as discussed in more detail below.

One embodiment of the secure data center 102 as shown in FIG. 1 is segmented into the security domain 104 and the production area 103. The security domain 104 represents those portions of the secure data center 102 in which all of the devices are secured and/or trusted. Any particular security mechanism that provides trust and/or security, such as by using cryptographic authentication, can be used to establish the security domain 104. The production area 103 represents those portions of the secure data center 102 where at least some of the components or devices may not be cryptographically authenticated.

The security domain (e.g., as maintained by the security domain controller 115) contains a computing device related identity datum that is stored in a persistent account 113. The security domain controller 115 establishes the computing device's identity in the security domain 104. The persistent account 113 of the security domain and the persistent identity 154 of the SIPA 106 are relied upon as described below when the computing device 105 including the SIPA 106 joins the security domain.

The computing device 105 bootstraps at least a portion of the operating system using the SIPA 106 to provide authentication to the computing device 105. Each computing device 105 that is undergoing such network bootstrap protocols as preboot may be authenticated based on the operation using the SIPA 106. At the onset of the SIPA's operation, the state of one embodiment of the computing device 105 may be limited to hardware initialization instructions such as provided by the Basic Input/Output System (BIOS), a network bootstrap program such as the Preboot Execution Environment (PXE), and authentication instructions provided by the SIPA 106 identity each as described in this disclosure. The SIPA 106 and the secure data center 102 provide a mechanism for the computing device 105 to obtain a cryptographically authenticated operating system.

An alternative preboot embodiment that enhances a network bootstrap protocol contains an Extensible Authentication Protocol (EAP) in which the computing device 105 can perform an authentication transaction (based for example on IEEE 802.1x communications) without an operating system, or by using a partial or minimal operating system.

The computing device 105 can download a minimal operating system from the automated deployment service 119. The automated deployment service 119 is in the security domain 104. A minimal operating system that is used to bootstrap a normal operating system is also referred to within this disclosure as a "minimal bootstrap". The minimal operating system yields a minimal degree of authentication for the SIPA. Immediately following the download, the computing device 105 and the minimal operating system are both unauthenticated with respect to the security domain. The minimal bootstrap uses credentials in the SIPA in response to authentication requests from the switch 109 that provides port authentication to establish either a mutual authenticated identity or a one-way authenticated identity.

The SIPA 106 uses established cryptographic operations to provide authentication between its associated computing device 105 and the security domain 104. Cryptographic operations that are performed within the SIPA 106 include, but are not limited to: key generation, encryption, and decryption. In one embodiment, the SIPA 106 replaces the identity of the operating system within the computing device 105 to establish the identity of the computing device with respect to the security domain 104. The identity of the computing device 105 is characterized by the hardware and the operating system of the computing device. This capability of storing the identity of the computing device 105 in the SIPA 106 allows the computing device to be repurposed, which may include modifying the operating system on the computing device 105 or loading a different operating system on the computing device 105, without changing its identity.

In one embodiment, the SIPA may be emulated or simulated by a software-based operating system, a kernel, or a program. Within this disclosure, the term "software" is intended to apply to firmware as well. The software-based operating system, kernel, or program derives its identity at least in part from the persistent identity 154. In one embodiment, the security domain (including a directory of resources in the security domain) uses cryptographic techniques and cryptographic keys as provided by the SIPA to separate the resources within the directory of resources.

The SIPA 106 provides mutual or one-way authentication between the computing device 105 and the security domain 104 that establishes the identity of the computing device independent of the state of the operating system or the computing device. The SIPA 106 enables a secure network bootstrap, enables a secure operating system installation, and mitigates the vulnerabilities of such non-authenticated protocols as the Preboot Execution Environment (PXE).

Purposing of the computing device refers to the initial set-up or configuration of the computing device. Purposing of the computing device includes, for example, adding the operating system and/or application programs to the computing device and initially configuring the operating system and/or application programs. Repurposing of the computing device refers to changing the set-up or configuration of the computing device. Repurposing of the computing device includes, for example, removing, replacing, adding to, or changing the operating system and/or application programs within the computing device. A computing device can be repurposed at any point after being purposed (e.g., a computing device may be repurposed one hour, one week, three years, etc. after being purposed). During the purposing or repurposing of the computing device, the operating system establishes an identity (or machine account) of the computing device (based on the SIPA of the computing device) to the security domain.

Certain embodiments of the SIPA within the computing device establish mutual authentication such that each computing device is able to provide a persistent identity to the security domain, and vice versa. Other embodiments of the SIPA within the computing devices performs one-way authentication. With one-way authentication, each computing device provides a persistent identity to the security domain. Whether the computing device performs mutual or one-way authentication is a function of the SIPA and its relation to the security domain. One-way authentication need not import a domain public trusted certificate to the SIPA within the computing device during the staging operations as described within this disclosure, as is typically done for mutual authentication.

Certain embodiments of the various components of the secure data center 102 are described in greater detail with respect to FIG. 2. The secure data center 102 includes the components of both the security domain 104 and the computing device 105 with the SIPA 106. In one embodiment, the security domain 104 includes a security domain controller 115, a switch 109, an authentication server 108, a boot server 116, an optional certificate authority 110, an automated deployment service 119, and a firewall 112. The firewall 112 as shown in FIG. 2 allows the services in the secure data center to be made available to computing devices, and acts to limit access to data contained within the security domain 104 to unintended remote third parties and rogue servers 199.

The components as described with respect to FIG. 2 that create and service a security domain 104 include the security domain controller 115 and the certificate authority 110. The certificate authority 110 represents a third party that can provide authentication between the computing device 105 and the security domain 104. The certificate authority 110 may be at least partially contained within the security domain 104, or alternatively may be remote from secure data center 102. The certificate authority 110 issues certificates based on asymmetric cryptography, e.g., as part of a public key infrastructure (PKI). In one aspect, the security domain controller 115 uses a persistent account 113 to provide a secure and trusted location to derive and store user and computing device identities that are used for authentication. The authentication server 108 authenticates the computing devices 105 using the security domain controller 115.

In one illustrative embodiment as described relative to FIG. 2, each computing device 105 within the secure data center 102 includes a central processing unit (CPU) 132, a memory 134, an input/output (I/O) portion 136, files and/or firmware 138, and a SIPA 106. In one embodiment, the components 132, 134, 136, 138, and 106 are each attached to a motherboard contained within the computing device. Files and/or firmware 138 can be configured to allow the computing device 105 to solicit the network for a network identity, and to form message transactions on a network.

Each computing device 105 can optionally download at least a portion of its operating system using the automated deployment service 119 and the security domain controller 115. The automated deployment service 119, as shown in FIG. 2, manages the configuration and installation of operating system software on the computing devices 105. All of the computing devices 105 in the secure data center 102 may utilize the same automated deployment service 119. Alternatively, multiple automated deployment services 119 may distinctly manage different computing devices 105. Different automated deployment services 119 may manage a particular computing device at different levels of authentication.

In certain embodiments of the present disclosure, a computing device 105 may be authenticated with the automated deployment service 119 after being added to secure data center 102. During operation, when a computing device 105 is added to the secure data center 102, the newly added computing device 105 is automatically configured to authenticate the computing device.

Within this disclosure, a bootstrap program is considered a program that downloads all or a portion of the operating system. The bootstrap program typically contains less code than the operating system due to their relative operations and complexities. Certain embodiments of authentication can be provided during booting, rebooting, recovery, and other purposing processes that occur during normal computing device operation in prior systems, but without the authentication as provided in this disclosure.

Figure 13:
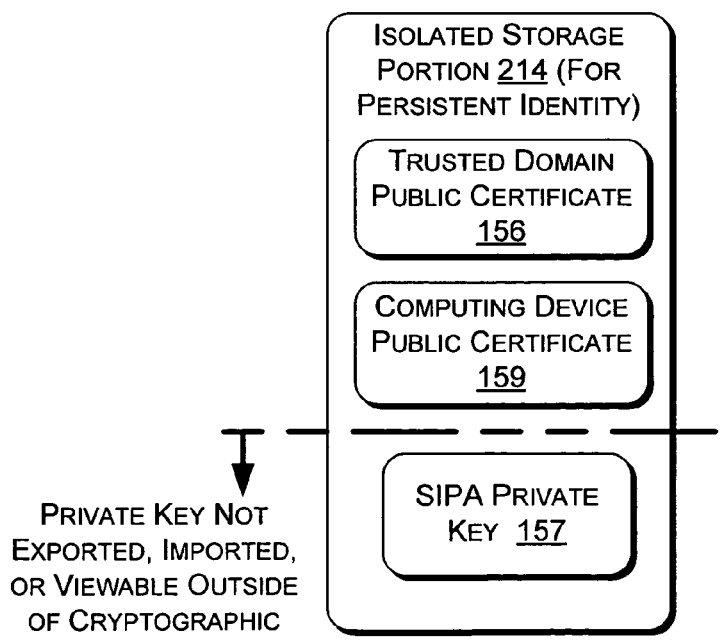
FIG. 13 is a block diagram of one embodiment of a persistent isolated storage portion of a SIPA.

Within this disclosure, a machine account may provide one embodiment of a secure identity within the directory in the security domain 104. The credentials within the SIPA (e.g., the SIPA public key or the computing device public certificate 159 as shown in FIG. 13) are used to establish a machine account in the security domain based on a shared secret. The SIPA public key, or the computing device public certificate 159 that encapsulates the SIPA public key as shown in FIG. 13, is "mapped" to an database account (not shown) in the security domain controller 115 as shown in FIG. 2.

The computer account may be associated with instructions (e.g., policies) to install a particular type or version of operating system or application program. According to one aspect of this disclosure, an installation policy is stored in the automated deployment service 119 of the security domain controller 115 that conveys "managing" the computing device 105. The automated deployment service 119 includes a database containing data relating to the computing devices 105, the users, and policies. The security domain controller 115 carries out the operations of authentication of the automated deployment service 119, and as such the security domain controller 115 can be considered as providing some of the operations of the automated deployment services 119. In one embodiment, the security domain 104 contains an identity datum in the persistent account 113 for each participating computing device 105 that establishes the identity of that computing device.

FIG. 2 also illustrates two Virtual Local Area Networks (VLANs): a production VLAN $V_1$ and a private VLAN $V_2$. Many types of networks can be segregated into multiple VLANs for network isolation. In this disclosure, messages between computing devices are assumed to remain isolated on those VLANs that they are a respective member, but not on additional network devices such as switches, routers, or other network devices that are used to transmit messages between multiple VLANs. As such, devices in a VLAN can communicate freely with other nodes in the same VLAN, but cannot talk directly to nodes outside the VLAN. Placing two or more computers in a VLAN is the equivalent of connecting those computers to the same physical network. VLANs can be implemented as port-based VLANs or protocol-based VLANs. Port-based VLANs occur within a single switch while protocol-based VLANs can span multiple switches. An example of protocol-based VLANs is standardized according to IEEE 802.1Q. The IEEE 802.1Q standard describes how packets are marked and how VLANs are supported.

The private VLAN $V_2$ is a limited virtual network that the switch 109 permits messages to be sent across. In one embodiment, the computing devices 105 that are not authenticated are attached to ports that are members of the private VLAN $V_2$. After authentication, the switches 109 may be configured to move the port and the computing device to a different VLAN, such as production VLAN $V_1$. In a preferred embodiment, anytime a link is disconnected (e.g., a computing device is powered down or disconnected from the switch 109), the port switches back to the private VLAN $V_2$.

Example Isolated Storage of Persistent Trusted Cryptographic Information within SIPA One embodiment of the SIPA 106 as described relative to FIG. 2 includes a private cryptographic processor 150 and an isolated storage portion 152. One embodiment of the isolated storage portion is described with respect to FIG. 13 below. The SIPA can be configured to provide a variety of functional interfaces that maintain at least a portion of a persistent identity 154 isolated from other portions of the computing device and the secure data center 102. The isolated storage portion 152 contains a persistent identity 154 that persistently and privately contains one or more keys 158.

Persistent identity 154 can take different forms in different embodiments. In certain embodiments, persistent identity 154 is a private key of a public/private key pair (in such embodiments, key(s) 158 includes private key 157 of FIG. 13). In such embodiments, isolated storage portion 152 also typically includes a computing device public certificate 159 that includes the public key of the public/private key pair, as illustrated in FIG. 13. Alternatively, persistent identity 154 may be the public/private key pair. In other embodiments, the persistent identity 154 includes some identifier other than part or all of a public/private key pair, such as a symmetric key.

Isolated storage portion 152 also optionally contains a trusted domain public certificate 156 containing a public key of the security domain 104 (e.g., a public key of authentication server 108). The trusted domain public certificate 156 allows security domain 104 to be authenticated to computing device 105 as discussed in more detail below.

The computing device public certificate 159 containing the public key of SIPA 106 is mapped to a computer account. In one embodiment, this mapping occurs in the staging area prior to the computing device 105 being placed into the production area 103 as shown in FIG. 1.

At least some of the content of the isolated storage portion 152 is not exposed beyond the SIPA 106. Particularly, at least the private key 157 of the public/private key pair is not exposed beyond the SIPA 106. The SIPA 106 is a physically and operationally distinct cryptographic processing area from the CPU 132 and the memory 134 of the computing device. The private key 157 may be accessed and used by the cryptographic processor 150, but not by any component external to the SIPA 106 (e.g., the CPU 132 or the memory 134).

The cryptographic processor 150 (and not the CPU 132) is configured to operate on the private key 157 or any sensitive cryptographic information that is contained within the isolated storage portion 152. The term "isolated" in the phrase "isolated storage portion" 152 indicates that any data within this storage portion that is associated with the SIPA private key 157 is structurally isolated from, and acts independently from, the memory 134 in the computing device 105. In certain embodiments, the entirety of isolated storage portion 152 is structurally isolated from, and acts independently from, the memory 134. Such structural isolation is accomplished, for example, by having only cryptographic processor 150 being able to access the isolated memory. Any requests that require access to information within the isolated memory (such as encrypting data using private key 157) are directed to cryptographic processor 150. Cryptographic processor 150 can access the isolated portions of memory and perform the requested operations, but will not reveal the contents of the isolated portions of memory to any requester.

By designing the isolated storage portion 152 to maintain the SIPA private key 157 physically separated from the memory 134 accessible by the cryptographic processor 150, and physically protected, the sensitive cryptographic information such as the private key 157 that is contained within the isolated storage portion 152, is isolated from any other party or computer outside of the SIPA. Undesired third parties (including but not limited to malicious software, malicious operating systems, and malicious computing devices) therefore have great difficulty in obtaining access to the original information or data that was encrypted.

The SIPA 106 will support a SIPA driver for interfacing the SIPA to the operating system of the computing device 105 and contain the cryptography processor 150 that is capable of Rivest, Shamir, Adleman (RSA) or other algorithms for supporting asymmetric challenge-response, encryption, and decryption operations. In one embodiment, the cryptographic processor 150 will support asymmetric key pair generation. In other embodiments, the cryptographic processing engine of the SIPA 106 is implemented with other algorithms including symmetric algorithms. Many versions of both asymmetric encryption and symmetric encryption are generally known in cryptographic applications and will not be further described in this disclosure.

The SIPA 106 may be implemented on the motherboard of the computing device 105 in the form of, for example, a dedicated chip or a baseboard management controller. In certain embodiments, the SIPA 106 sends data directly to and receives data directly from the CPU 132. For example, the CPU 132 may send a request to the SIPA 106 that particular data be encrypted using the private key 157, and the SIPA 106 may return the encrypted data to the CPU 132. In other embodiments, both the CPU 132 and the SIPA 106 may access a region of the memory 134 to transmit results and/or requests.

The security behind asymmetric cryptographic operations within the SIPA 106 relies on maintaining the private key 157 secret from others. A third party obtaining the private key 157 from the SIPA 106 would compromise the authentication process. With the SIPA 106 configured as shown in FIG. 2, only the cryptographic processor 150 and not the CPU 132 performs processing on data that is associated with the SIPA private key 157, which is contained within the isolated storage portion 152 for the computing device 105. The private key 157 is never exposed outside the cryptographic processor 150. As such, no processor outside of the cryptographic processor 150 can directly see, detect, analyze, discover, or use the private key 157 based on the trusted domain public certificate 156 that is located within the isolated storage portion 152.

The isolated storage portion 152 is configured to be tamper-resistant. The isolated storage portion 152 protects the private key against attacks including physical removal and replacement. In one embodiment, the isolated storage portion 152 is remote from a "core area" on the motherboard that includes the I/O 136, the memory 134, and the CPU 132.

The SIPA 106 therefore allows for mutual authentication or one-way authentication for computing devices 105 using a secured identity that is authenticated through cryptographic algorithms. This mutual authentication uses authentication techniques such as public/private key pairs by which two communicating parties can each: a) prove who they are to the other party, b) confirm that the other party is whom they are claiming to be.

In certain embodiments, the SIPA 106 may be located adjacent to such interfaces such as the input/output portion 136, which often communicates using a high-speed bus. Programmatic isolation is provided between the tamper-resistant isolated storage portion 152 of the SIPA 106 and the interfaces. A low-bandwidth on-chip communication path can be provided to form a management channel between a core of the motherboard and the SIPA 106.

Since the SIPA 106 authenticates the computing device 105, it is important to ensure that the SIPA is not physically moved to another computing device to provide incorrect authentication to the wrong computing device. In certain embodiments to further positively associate the SIPA with its computing device, the SIPA 106 is physically secured to the motherboard in some manner that can be considered as permanent, e.g., by soldering. This physical connection between the SIPA 106 and the computing device 105 establishes a substantially permanent identity of the SIPA 106 relative to each computing device 105. The SIPA thereby becomes physically integrated within the motherboard in many embodiments of the computing device 105. By integrating the SIPA 106 into the computing device 105, removing the SIPA 106 from the motherboard becomes so prohibitively difficult that it effectively destroys the functioning of the SIPA and the identity of the computing device. While this disclosure describes one embodiment in which the SIPA 106 is attached to the motherboard, it is envisioned that the SIPA may alternatively be attached to some other component or piece of the computing device 105, such as a component or piece that is difficult to disassociate with the computing device.

It may also be desired in certain embodiments that supplemental components are associated with the SIPA 106, in which the supplemental components are attached to and integrated within the motherboard of the computing device. The private key of the computing device is not imported or exported beyond the cryptographic processor 150 as shown in FIG. 13. One implementation of the SIPA 106 permits the computing device key pair to be regenerated. In certain optional embodiments, the computing device key pair is "electronically programmed" in a one-time writable memory. In an optional embodiment, the SIPA supports an interface to export the computing device public key. The computing device key pair is generated in isolation within the SIPA 106 and may be re-initialized through, for example, a limited access hardware jumper. The SIPA 106 further includes a results area, not shown, that provides cryptographic analysis from, or allows messages that are conveyed to the SIPA to be displayed.

In one embodiment, a hardware reset is available to the SIPA on the motherboard. When the SIPA 106 "calls" or "executes" the hardware reset function, the motherboard that contains the SIPA is forced to reboot in an equivalent to power-off and power-on re-cycling.

Additionally, in one embodiment, the minimal bit length of the keys 158 is 1024 bits. Different bit lengths can be selected to provide the desired cryptographic security. Longer bit lengths are typically deemed as providing greater security, but also typically require more computational power to use. The selected bit lengths may relate to the application and current state of the art in attempts to break the cryptographic SIPA private key 157.

Furthermore, in one embodiment, the computing device's authenticated identity from the SIPA is used as the normal operating system identity. The identity of the SIPA 106 persists through the life-cycles of the computing device 105 that is repetitively configured or repurposed using a new operating system, new application software, and/or related new software data.

Example Computing Device Purposing

It is often desired to "purpose" or "repurpose" a particular computing device 105 to perform a particular function. Such purposing of the computing device often dictates an appropriate operating system for the computing device (or particular settings for the operating system). For instance, one computing device may be purposed either as an authentication server, a boot server, a web server, or another type of server. The purpose of a particular computing device 105 such as a server is largely a function of its resident software such as particular application programs and operating systems.

A number of servers as shown in FIG. 2 that are in communication with the switch 109 can be purposed to provide different functions. For example, the authentication server 108 can be purposed to provide authentication and secure boot protocol knowledge, and switch management interface. Additionally, the boot server 116 can be purposed to provide such network booting services as Dynamic Host Configuration Protocol (DHCP), Preboot Execution (PXE), and Trivial File Transfer Protocol (TFTP).

Repetitive bootstrapping of an operating system is desired in certain embodiments, and in certain instances is required. In routine situations, an operating system is re-started or rebooted from warm reset of the operating system or cold restart of the underlying hardware. In these situations, the operating system reestablishes its identity with the secure domain. The SIPA and methods described herein enable the operating system to transition from/to on-line to/from off-line or to be replaced completely, but in all cases the computing device retains its identity in the SIPA. As such, the SIPA allows the computing device to be purposed and repurposed.

Additionally, one or more computing devices 105 may be re-configured (also referred to as repurposing) after being added to security domain 104 within the secure data center 102. For example, a particular computing device 105 may operate for a period of time, e.g., on the order of minutes, hours, days, months, etc., performing one function, and then the security domain controller may decide that a different function is desirable. Such a change of function during reconfiguration may include, e.g., a change from being a server computer to a workstation computer, from a web server to a local file server, etc.

One embodiment of the SIPA 106 enabling secure network bootstrap that provides a secure operating system installation through repetitive cycles as a computing device 105 is repurposing. Repurposing the computing device includes processes as restarting the hardware, booting the operating system, installing application programs, and tearing-down of the computing device.

When the computing device 105 bootstraps the operating system using the bootstrap program, it downloads an operating system image that is used to provide the operating system. The identity of each computing device 105 is provided to the secure data center 102. The secure data center 102 then admits the computing device 105, if authenticated, by using the identity of the computing device to allow the computing device and its operating system to join the security domain 104 using a domain join.

A persistent operating system remains resident with the computing device 105 such as a server even after it has been shut down. If the operating system is not a persistent operating system, then a new copy of the operating system has to be accessed each time the computer is powered up. The operating system can be downloaded from a local or remote storage. A considerable portion of the operating system is downloaded or accessed each time the computing device is initiated, rebooted, etc. Providing authentication techniques in such systems that downloads a considerable portion of their operating systems is challenging since the portion of the operating system that is downloaded is often the portion that provides authentication.

In one embodiment, computing devices may have firmware encoded to be compatible with the Preboot Execution Environment (PXE). The Preboot Execution Environment (PXE) Specification, version 2.1 (incorporated herein by reference) is an Intel standard that provides for bootstrapping a client platform typically packaged in firmware, hardware, or the Basic Input/Output System (BIOS). In one embodiment, PXE is typically packaged in firmware such as a flash chip. It can be extracted to another media such as a floppy disk; many aspects of the present disclosure are directed to automation that favors firmware. PXE is a protocol that is packaged as extensions to the Dynamic Host Configuration Protocol (DHCP), described in both RFCs 2131 and 3118. The DHCP protocol is based on the Bootstrap Protocol (BOOTP). The Intel Binary Integrity Service (incorporated herein by reference) represents a standard for adding a cryptographic checksum of the first binary program downloaded in the PXE protocol. Other boot protocols can be used instead of the PXE. In one embodiment, the SIPA requires a network bootstrap, but is not dependent on the PXE.

The secure data center 102 supports a number of protocols that are associated with booting such as the Dynamic Host Configuration Protocol (DHCP) and the Preboot Execution Environment (PXE) protocol that, each operating by itself is subject to network intrusion. The secure data center 102 and the SIPA 106 provide a mechanism to provide an authentication mechanism, and thereby reduce potential network intrusion. In one embodiment of the SIPA 106, the security domain 104 is accessible via the secure data center 102 over a local area network. Certain other bootstrap protocols may support TCP or other reliable transport protocols for use with a wide area network.

Example Staging Area

In one embodiment as described with respect to FIG. 1, the secure data center 102 is associated with the staging area 120 (also referred to as a staging area). With the staging area 120, a trust relation is established between the computing device and the secured domain that is based on the identity of some trusted individual that brings the computing device having a new and un-configured SIPA into the staging area. The new and un-configured SIPA, such as exists when the SIPA is initially inserted into its computing device 105 and located within the staging area 120, does not contain any key information and can be considered as a hollow container to receive key information. Only those computing devices that have an un-configured SIPA which are desired to be configured to be trusted are brought into the staging area 120. The trusted person brings in the new and un-configured computing device to the staging area, and connects the staging area 120 to a port on the computing device.

This disclosure provides a staging area mechanism by which 1) authentication of the production network occurs by copying key information from the staging area to the production network, and 2) the staging area signs a certificate, and then gives the certificate back to the computing device (the computing device uses the certificate to authenticate itself relative to the production network). One difference between case 1) and case 2) is that with case 2), there does not need to be a network connection between the staging area and the production network.

A computing device with a previously configured SIPA can be recycled in the staging area by erasing its previous contents and treating it as an un-configured SIPA.

There are different cases as described involving the staging area. One case involves the authentication server exchanging public keys with the computing device that is connected to the staging area. Another case involves the computing device presenting its public key to the authentication server, and wrapping the public key in a certificate such as the computing device public certificate 159 as shown in FIG. 13 that in one embodiment is signed by the certificate authority 110 of FIG. 1. The certificate is handed back to the computing device that includes the SIPA. In both of these cases, a trust relation is established that can be verified at some future time based on the public key as contained in the computing device public certificate 159 shown in FIG. 13 from the computing device.

Figure 3:
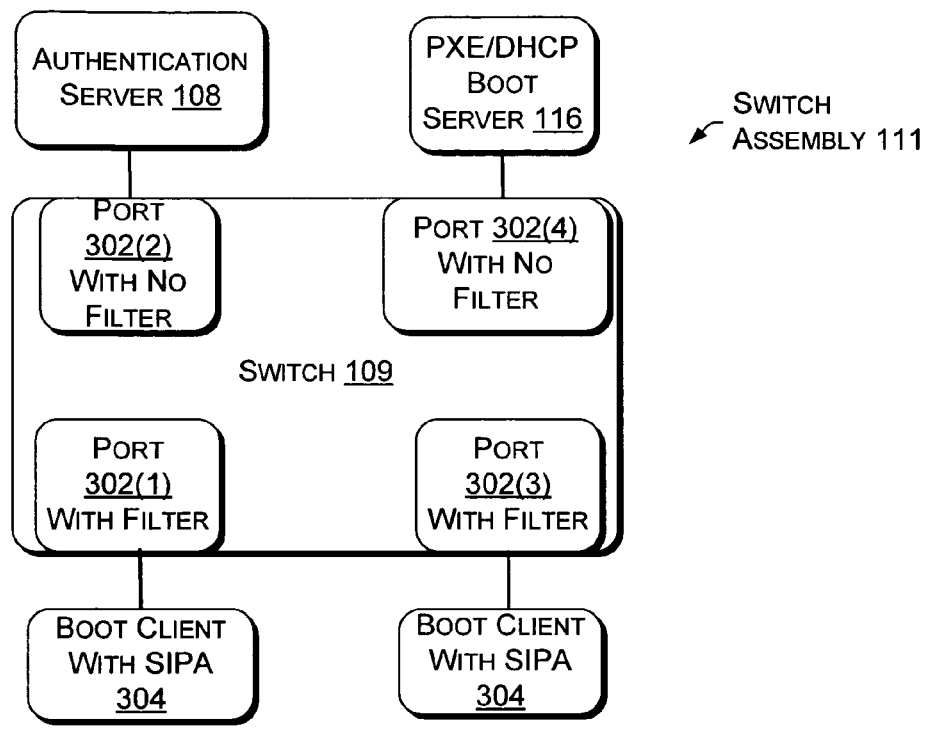
FIG. 3 is a block diagram of one embodiment of a switch assembly that is included in the security domain of FIGS. 1 and 2.

The staging area 120 provides keys for the computing device 105 with respect to the security domain prior to the removal of the computing device from the staging area 120, and the subsequent insertion of the computing device into the production area 103 as shown in FIG. 3.

The embodiment of staging area provides a protected environment with greatly reduced interfering network data. The staging area is configured to reduce the threat of another unintended party (e.g., computing device) seeing data that is being transmitted between the computing device 105 and the security domain 104.

The scenario established for either mutual authentication or one-way authentication of the computing device 105 includes initially receiving the computing device 105 with an un-configured SIPA, e.g., from the factory. The computing device 105 is then moved into a staging area. Within the staging area, the SIPA is requested to generate a new public/private key pair. This request can be a manual request (e.g., by setting a hardware jumper(s) on the computing device) or a more automated request (e.g., from a server on the staging area). The SIPA will create certificate requests along with the SIPA public key to a certificate authority to enroll the SIPA in a public key infrastructure. Furthermore, to support mutual authentication, a trusted domain public certificate 156 is also typically transferred to the SIPA.

In certain embodiments, while in the staging area, the public key associated with each computing device 105 is registered within the security domain 104. Typically, the computing device public certificate 159 is registered within the security domain 104. The public key (or public certificate) can be stored, for example, in persistent account 113. The secure data center 102 can map the public key (or the public key certificate) to a computer account for the computing device 105 and subsequently use that public key (or public key certificate) during authentication operations with the newly configured computing device 105.

When the computing device 105 exits the staging area, the computing device contains the private key 157 and two public certificates. The first public certificate is the computing device public certificate 159 as shown in FIG. 13 that is associated with that computing device. The computing device public certificate 159 allows the computing device to later validate itself to components or devices in the security domain 104.

The second public certificate contained in the computing device is the trusted domain public certificate 156 as shown in FIG. 13. The trusted domain public certificate 156 is the certificate of the trusted security domain 104. The trusted domain public certificate 156 allows the computing device including the SIPA to validate the security domain 104 or entities within the security domain using industry standard protocols. The trusted public key would, in one embodiment, represent the public root certificate of the security domain. The SIPA would trust that certificate and through protocols not mentioned in this disclosure, SIPA would then trust representatives of the secure domain that would be the domain controller, or other authentication service.

The public certificates 156 and 159 can take any of a variety of forms. In one embodiment, both of certificates 156 and 159 conform to the X.509 standard.

After the computing device 105 including its configured SIPA is removed or unplugged from the staging area, the computing device is integrated or plugged into the production area 103 (also referred to as a production network).

The access to the staging area 120 is thereby controlled through physical security. One advantage of the staging area is that no prior trust relation or identity is assumed between the computing device and the security domain prior to the computing device entering the staging area.

It should be noted that, although staging area 120 is illustrated as being coupled to security domain 104 of secure data center 102 in FIG. 1, in alternate embodiments such a coupling may not exist. In such alternate embodiments, authentication information (such as a public key of the computing device or a computing device public certificate) can be copied from the staging area 120 to the security domain 104. This copying can be performed in a variety of different manners, such as: sending an electronic mail (email) message, optionally encrypted, to the security domain 104; having a removable storage media such as a magnetic disk, optical disc, flash memory, etc. on which to store the authentication information; and so forth.

Example Switch and VLAN Structure

After the SIPA 106 of the computing device 105 is configured in the staging area 120 of FIG. 1, the computing device 105 can be placed in the production area 103 of the secure data center 102. In addition to the security offered by the SIPA 106, the network switch(es) 109 can be used to further enhance the security of data center 102. For example, in certain embodiments, a protocol such as PXE is used to obtain boot images over a network. However, there is typically no network security built into PXE. When a computing device sends out a request for a boot image, the computing device accepts a boot image from any computing device that responds to the request that the computing device sent. The computing device thus responds to any device that responds to its request, even if that device is a hostile or rogue computer.

As discussed above, in one embodiment, there are two VLANs that are described with respect to the security domain 104, and may each be considered as integrated in the switch 109. The two VLANs are the production VLAN $V_1$ and the private VLAN $V_2$ as shown in FIG. 2. The SIPA architecture supports authentication of the computing device 105 before accessing the production VLAN $V_1$ and for authenticating the computing device for membership in the security domain as occurs with a domain join. The switch 109 provides isolation for the boot process.

When a computing device 105 such as a boot client first bootstraps, the server will be on a private VLAN $V_2$. The computing device 105 negotiates via the boot server (such as the preboot execution, or PXE boot server) for an operating system. At this time, neither the computing device 105 nor its operating system are trusted by either the switch 109 or the security domain. In the 802.1x protocol, the switch 109 initiates a message using in one embodiment the Extensible Authenticated Protocol (EAP) as configured by the user. The computing device 105, called in this configuration a "supplicant", responds with credentials based on its SIPA 106. The authentication server 108 performs a protocol challenge that is used to establish one-way or mutual identity. If the authentication succeeds, the switch 109 permits the port to become a member of a production VLAN $V_1$. The computing device 105 then submits a request to join the security domain. Upon success, the computing device 105 is authenticated and ready for authorized transactions. This authentication process is discussed in more detail below.

FIGS. 3 and 4 illustrate network switches 109 in additional detail. FIG. 3 illustrates an example with a single network switch 109, while FIG. 4 illustrates an example with three network switches 109. Other embodiments may include two network switches 109 or three or more network switches 109. One or more network switches 109 are also referred to herein as a switch assembly 111.

Each network switch 109 can be directly coupled to zero or more boot clients 304, which are computing devices 105 (e.g., of FIGS. 1 and 2). Each network switch 109 can also be directly coupled to zero or more other devices, such as an authentication server 108, a boot server 116, a rogue or malicious server 199, and so forth. In certain embodiments, the switch 109 couples a number of computing devices 105 to the security domain 104. In other embodiments, the switch 109 couples and controls data transmission between multiple computing devices 105 that are associated with the security domain 104 as shown in FIG. 1.

Certain embodiments of the switches 109 (a variety of which are described with respect to FIGS. 3 and 4) allow for those computing devices 105 in the production area 103 that have not joined the security domain to join the security domain 104, and allow those computing devices 105 that have joined the security domain to use the security domain.

Each port 302 in FIGS. 3 and 4 is physically located on one switch 109, and each switch includes multiple ports. Each port 302 is provided with a parenthetical reference in FIGS. 3 and 4 such as 302(1), 302(2), 302(A1), 302(B1), 302(C1), etc., to distinguish the ports even though the structure, function, and operation of each port can be identical, except as where particularly indicated. The ports 302 provide for data transfer and communication between each switch 109 and a computing device, a server, another switch, or the like. The ports 302 can be configured to provide or represent any level of abstraction. Within this disclosure, each switch 109 can be configured as any network box working to create an isolated channel so message traffic, in particular broadcast traffic, remains on the isolated channel.

Within the secure data center 102, each computing device is attached to the switch 109 that supports port authentication. The individual switches 109 can operate at the link-layer level, so the port filter is called a link-layer port filter. To provide security, switches 109 have port filters on some of the ports. The port filters are placed on certain ports 302 and not on other ports as shown in FIGS. 3 and 4 to allow the boot client to send messages to only specific other ports, and/or to receive messages from only specific other ports.

This disclosure provides a technique for establishing a secure boot network within the secure data center 102 by viewing network ports as being separated into two classes: trusted ports and un-trusted ports. A port that couples to either a boot client 304 or another switch 109 that has boot clients 304 attached thereto but no trusted server attached thereto is classified as an un-trusted port. A port that is coupled directly, or via one or more additional network switches, to a trusted server such as a boot server 116 or an authentication server 108 is classified as a trusted port. In one embodiment, a trusted person such as a network operator determines which ports are trusted. This can be done, for example, when a trusted server such as a boot server 116 or an authentication server 108 is coupled to a switch 109. Optionally, other ports can later be indicated as trusted (e.g., after the device coupled to the port is authenticated to the security domain based on its SIPA 106).

The port filters are used in network switches 109 so that boot clients coupled to un-trusted ports can communicate only with devices on trusted ports. In certain embodiments, the port filters are applied to transmitted signals. Filters are applied to each un-trusted port to restrict the port so that the un-trusted port can only send network packets to trusted ports. There are no filters on the trusted ports, and the devices coupled to the trusted ports can transmit network packets to all ports of the network switch 109. So, if any network packets are sent by a boot client 304 coupled to an un-trusted port, the port filter on that un-trusted port will not pass the network packets to any un-trusted port. For example, if a request were sent targeting a particular boot client on another un-trusted port, the filter would not pass the request to that other un-trusted port. By way of another example, if a broadcast request were sent that was not intended for a particular recipient or port, then the filter would pass the request on to only trusted ports.

In other embodiments, the port filters are applied to a respective port to filter the signals received at the port. Filters are applied to each un-trusted port to restrict the port so that the un-trusted port can only receive network packets from trusted ports. There are no filters on the trusted ports, and the devices coupled to the trusted ports can transmit network packets to all ports of the network switch 109. If any network packets are received at the un-trusted port to which a particular boot client is coupled, the port filter on that un-trusted port will only pass the particular boot client network packets that have been received from a device coupled to a trusted port. For example, if a data packet (such as a response to a request previously sent by the particular boot client) were received at the un-trusted port, then the filter would pass the data packet on to the particular boot client only if the data packet were received from a trusted port (regardless of whether the data packet was sent targeting the particular boot client or was a broadcast data packet).

Using filtering, broadcast messages (such as messages sent by boot clients 304 when bootstrapping) are directed to one particular listening port that the boot server 116 is coupled to. One boot server 116 is coupled to a listening port (302(4) in FIGS. 3 and 302(A4) in FIG. 4) and receives the broadcast messages from all boot clients 304. The boot server 116 coupled to the listening port (302(4) in FIGS. 3 and 302(A4) in FIG. 4) provides a suitable bootstrap service such as DHCP and PXE, and responds appropriately to the broadcast messages with response messages.

The ports 302 as shown in the switches 109 in FIGS. 3 and 4 are provided with either a filter or no filter as indicated in the figures. The presence of a filter within each port 302 that is connected to a first boot client 304 prevents broadcast requests from a second boot client from reaching the first boot client. Many filters that are applied to the ports 302 of the switches 109 are selective so that boot clients 304 receive only certain messages from other servers such as boot servers and authentication servers, etc. The ports 302 that are coupled to either a boot server 116 (such as the PXE/DHCP server), an authentication server 108, or another switch 109 that has a boot server 116 or authentication server 108, have no filter. Those ports 302 that are coupled to a boot client 304 or a port 302 to another switch 109 that is not coupled to the boot server 116 or authentication server 108 has a filter.

One embodiment of the switches 109 such as can be applied in the embodiments of FIGS. 3, and 4 are IEEE 802.1x compliant, and as such they support link-layer source port filtering, and private VLAN $V_2$ protocols. The link-layer source port filtering directs message traffic within the switch before the computing device 105 is authenticated. In this mode, broadcasts from each boot client 304 are directed to a designated source port that corresponds to the boot server 116.

The networked configurations or topographies using the switches 109 can vary considerably. For instance, the FIG. 3 network includes a single switch 109 while the FIG. 4 network includes three switches 109 (described as the upper, middle, and lower switch based on their relative positions in FIG. 4).

With reference to FIG. 4, for example, the middle switch 109 configures port 302(A4) as the source port because it is connected to the boot server 116. The upper switch 109 of the switch assembly 111 has port 302(B3) as the configured source port because it is coupled to the middle switch (to which the boot server 116 is coupled). Similarly, the lower switch 109 of the switch assembly 111 has port 302(C3) configured as the source port.

Broadcasts from each boot client 304 in the upper switch 109 are directed to the port 302(B3) on the upper switch that is connected to the port 302(A2) on the middle switch since the boot server is on the middle switch, and the broadcasts do not make it through any other ports (e.g., ports 302(B1), 302(B2), 302(BN), 302(AN), 302(A5), 302(A1), 302(A3), and so forth) to other boot clients 304 due to the filters associated with the ports 304. Broadcast from each boot client 304 in the lower switch 109 are directed to the port 302(C3) on the lower switch that is connected to port 302(A5) on the middle switch, and do not make it through any other ports 302 to other boot clients due to the filters associated with the ports. Broadcast from any boot server 116 on the middle switch 109 are also directed to the ports 302(A4) and 302(A1) since they are respectively connected to the boot server 116 and the authentication server 108. Any boot client 304 on the upper switch 109 is serviced by the port 302(B3); and any boot client 304 on the lower switch 109 is serviced by the port 302(C3).

FIG. 4 therefore contains a link between the port 302(A2) and the port 302(B3). Also a link exists between the port 302(C3) and the port 302(A5). The boot clients 304 that broadcast on the upper switch 109 are each directed to port 302(A2) of the middle switch 109, to continue to port 302 (A4) to the boot server 116. The boot clients 304 that broadcast on the lower switch 109 are each directed to port 302(A5) of the middle switch, to continue to port 302(A4) to the boot server. In this manner, two or more switches 109 having a single boot (i.e., PXE) server and a single authentication server 108 can operate together.

An undesired rogue server 199 may exist on a switch 109 (e.g., the upper switch in FIG. 4). The authentication server 108 limits authentication of any rogue server 199 into the secure data center 102. Furthermore, the port filters limit the ability of the rogue server 199 to respond to any broadcast requests. There may also be other servers attached to non-authenticating switches 111. These other servers should be configured to limit impact of non-802.1x attached computing devices upon the infrastructure of the secure data center 102.

While there is only one boot server 116 illustrated in each of FIGS. 3 and 4, there may be certain embodiments of the secure data center 102 in which there are two or more boot servers 116 (coupled to the same switch 109 or different switches 109). In such configurations, each computing device 105 could mutually authenticate or one-way authenticate with one or more of the boot servers 116.

The switches 109 essentially provide physical port authentication and link-layer source port filtering to each computing device (that allows authentication with the private VLAN $V_2$, authentication with the production VLAN $V_1$, or authentication with a particular network, etc.) on/off, and/or port authentication.

The switch 109 directs the message traffic on a physical attachment (port) basis along with source port filters and bounded network addresses spaces to establish the virtual local area network(s) (VLAN) such as shown as $V_1$ and $V_2$ in FIG. 2. One embodiment of the switch 109 can be designed to operate based on the IEEE 802.1x protocol (incorporated herein by reference).

The configuration of the switches 109 as shown in FIGS. 3 and 4 mitigate vulnerabilities from using PXE and DHCP protocols, both of which are vulnerable to network based attacks. Rogue servers 199 such as on the port 302(BN) of the upper switch 109 of FIG. 4 cannot offer a PXE response because the original broadcast messages from all boot clients are directed away from ports with the rogue servers 199 (e.g., due to the filter within the port coupled to the rogue server 199). The rogue server 199 also cannot access the production VLAN $V_1$ until the particular switch 109 authenticates the rogue computing device 199, which the switch 109 will not do as the rogue server 199 will have no SIPA 106 or no SIPA 106 configured within the staging area.

The computing device 105, the switch 109, and the security domain 104 are used to begin a port authentication protocol when the operating system activates the hardware (associated with a network interface card in one embodiment) that is in communication with the switch 109. The computing devices that are characterized as the boot client with SIPA 304 are shown as being part of the security domain 104 in FIG. 4, which is true after the computing device joins the security domain. Prior to the computing device/boot server joining the security domain, the boot server is not a portion of the security domain. The rogue server 199 is never considered to be a portion of the security domain since it never joins the security domain. The switch 109 acts by detecting whether the link is live using link-layer media sense. This protocol provides one-way authentication. Mutual authentication is also provided if during the staging phase that is performed within the staging area as described with respect to FIGS. 8a and 8b, the computing device accepts and stores a public certificate or key of the trusted entity in the security domain.

Successful port authentication permits boot clients 304 to use the production VLAN $V_1$ as shown in FIG. 2. Failure to authenticate the boot client 304 causes the switch 109 to take no action. Failure to authenticate the security domain 104 of the secure data center causes the boot client 304 to refuse the offered operating system and retry the bootstrap. Under these circumstances, the boot client computing device remains isolated. Following the port authentication success, the client computing device is granted access to a production network such as production VLAN $V_1$. After joining the production VLAN $V_1$, the boot client's operating system initiates operations to join the security domain.

Example Domain Join

The operating system of the computing device 105 typically contains an identity associated with the operating system. This identity is established through some association with a computer account that is controlled by the security domain controller 115, and exists in the security domain 104 as shown in FIG. 2. The security domain controller 115 includes a list of the computing devices 105 (e.g., in a directory) that are known to, and trusted by, the security domain 104. This list is established as the computing devices 105 pass through staging area 104.

Data from the persistent identity 154 of the SIPA is physically separated from the operating system instance running on the computing device 105. The separation reduces the possibility that any keys, certificates, or key information that is contained within the SIPA would be compromised to locations outside of the SIPA. The computing device can be identified in the security domain controller 115 based on the persistent identity 154 of the SIPA 106 (e.g., based on the public key certificate of the computing device), and thus can be used rather than the identifier of the operating system of the computing device in the security domain controller 115. Alternatively, an identity of the operating system, separate from the public key or public key certificate of the computing device, can be generated based on the persistent identity of the SIPA 106 (e.g., using the public key certificate to authenticate the computing device) and be maintained in the security domain controller 115.

Credentials may be considered in this disclosure as computing device accessing credentials. In one embodiment, the security domain access credentials may be acquired on the computing device by: a) storing a persistent identity on the computing device; b) deriving data that includes the security domain access credentials from the persistent identity; and c)

transferring the derived data to a security domain to allow the computing device to join the security domain.

When a computing device with an identity communicates with the security domain, the computing device exchange messages for authentication. The computing device can be discovered as a unique entity on the network even if the computing device has no operating system on start-up by using the identity of the SIPA. With a computing device having a separate identity from the operating system, the security domain has the ability to communicate with either resource. In one embodiment, each operating system has a separate identity, and as such can be distinctly cryptographically authenticated from other operating systems and the persistent identity of the SIPA in the computing device.

Conventional security domain accounts are referred to as a computer account. This computer account relates to a computing device including its operating system and hardware. By storing the identity of the computing device persistently in the SIPA, the computer account is separated from the operating system instance uniquely and securely.

Using the persistent account stored in the security domain controller 115 and the persistent identity in the SIPA 106, a trust relationship can be established that provides a secure domain join of the SIPA 106 after the computing device is configured in the staging area. The secure domain join mitigates spoofing threats (by using the SIPA 106, the possibility of an imposter posing as the computing device is reduced). The SIPA secure domain join can also mitigate information disclosure that occurs in conventional computing devices joined to the security domain when trusted employees are given a secret used to join the computing device to the security domains. The SIPA 106 allows the authentication involved in the domain join to be automated and completed without human intervention.

Using the automatic secure domain join as provided by the SIPA interfacing with the security domain, input of a shared secret or key does not have to be performed by a trusted person as with conventional systems. This secure domain join allows the computing device to be authenticated automatically without keyboard input or certificate information by a trusted employee. The domain join is thereby automatic, remote, and no trusted employees have to travel to the computing device to perform the domain join. The computing device is provided membership in the security domain based on the trusted persistent identity that is contained in the SIPA.

Example Operating System Booting

This disclosure provides a variety of embodiments in which a portion of, or the entirety of, an operating system can be securely downloaded to a computing device. In one embodiment, only an initial boot portion of the operating system of the computing device 105 is initially maintained in persistent memory. As such, at least a portion of the operating system is retrieved from some remote location to the computing device 105 upon booting. As such, there is no requirement for local persistent storage of the entirety of the operating system within the memory 134.

Three memory configurations that allow for storing none or only a portion of the operating system within the local memory 134 of the computing system include: a) locally attached storage of the operating system; b) network attached storage of the operating system; and c) virtualized storage of the operating system in memory.

In locally attached storage of the operating system, the operating system can be at least partially located on the hard drive of the computing device 105. In another instance, the computing device stores its operating system in a chip attached to the motherboard or the motherboard itself, at some local location that is separate from the memory 134. When the operating system is instantiated, the operating system becomes resident in a random access memory (RAM) region of the computing device.

In network-attached storage of the operating system, the operating system is stored at some remote network location outside of the computing device 105. For example, in many workstation computing device environments, the operating system is booted over the network to a RAM within the computing device 105 from a storage unit on a server that is remote from the computing device.

In virtualizing the operating system in memory, data that is associated with the operating system is contained within a virtualized location such as a virtual disk (e.g., a RAM disk) within the memory 134. The data is copied to the virtual disk from some other location such as some network location.

In many versions, the SIPA 105 is structurally and functionally independent of the operating system state and the existence of the operating system on the client computing device as shown in FIG. 2. In these versions, the SIPA 106 can be configured as a complete and structurally separate package that is protected from and structurally distinct from the CPU 132 and the memory 134.

Example Authentication Process

One embodiment of an authentication mechanism is now described by which computing devices 105 become mutually authenticated or one-way authenticated with respect to the secure data center 102. The secure data center 102 is populated with computing devices 105 with SIPAs that are not configured, and are not yet part of security domain 104.

Figure 5:
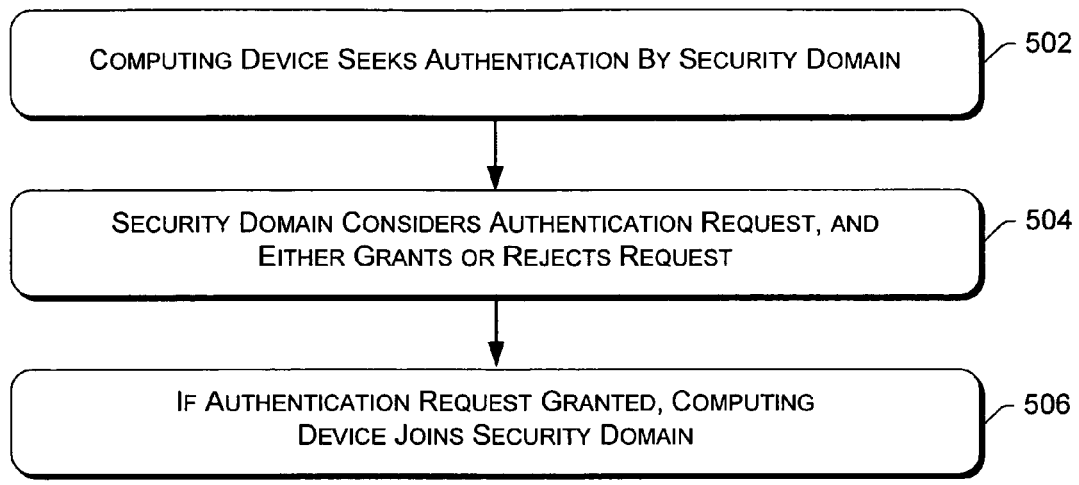
FIG. 5 is a flow diagram of one embodiment of a generalized authentication request.

One generalized embodiment of an authentication process 500 is described with respect to FIG. 5, in which the SIPA attempts to authenticate the computing device 105, such as a boot client 304 in FIGS. 3 and 4, with respect to the security domain as shown in FIGS. 1 and 2. The authentication process 500 starts with 502 in which the network computing device seeks authentication by the security domain. In 504, the security domain considers the authentication request of 502, and either grants or rejects the request. The security domain will grant the request if the trusted domain public certificate contains sufficient key information to authenticate the computing device that is associated with the SIPA. The authentication process 500 continues to 506 in which if the authentication request is granted, then the computing device joins the security domain 104 of FIGS. 1 and 2.

The authentication process 500 as described with respect to FIG. 5 involves both the computing device and the security domain. One embodiment of the authentication process 500 is described with respect to FIGS. 6a and 6b that describe respectively a computing device authentication process 600 and a security domain authentication process 630. The computing device authentication process 600 describes one embodiment, from the perspective of the computing device, of authenticating the computing device with respect to the security domain. The security domain authentication process 630 describes one embodiment, from the perspective of the security domain, of the security domain authenticating the computing device.

Figure 6A:
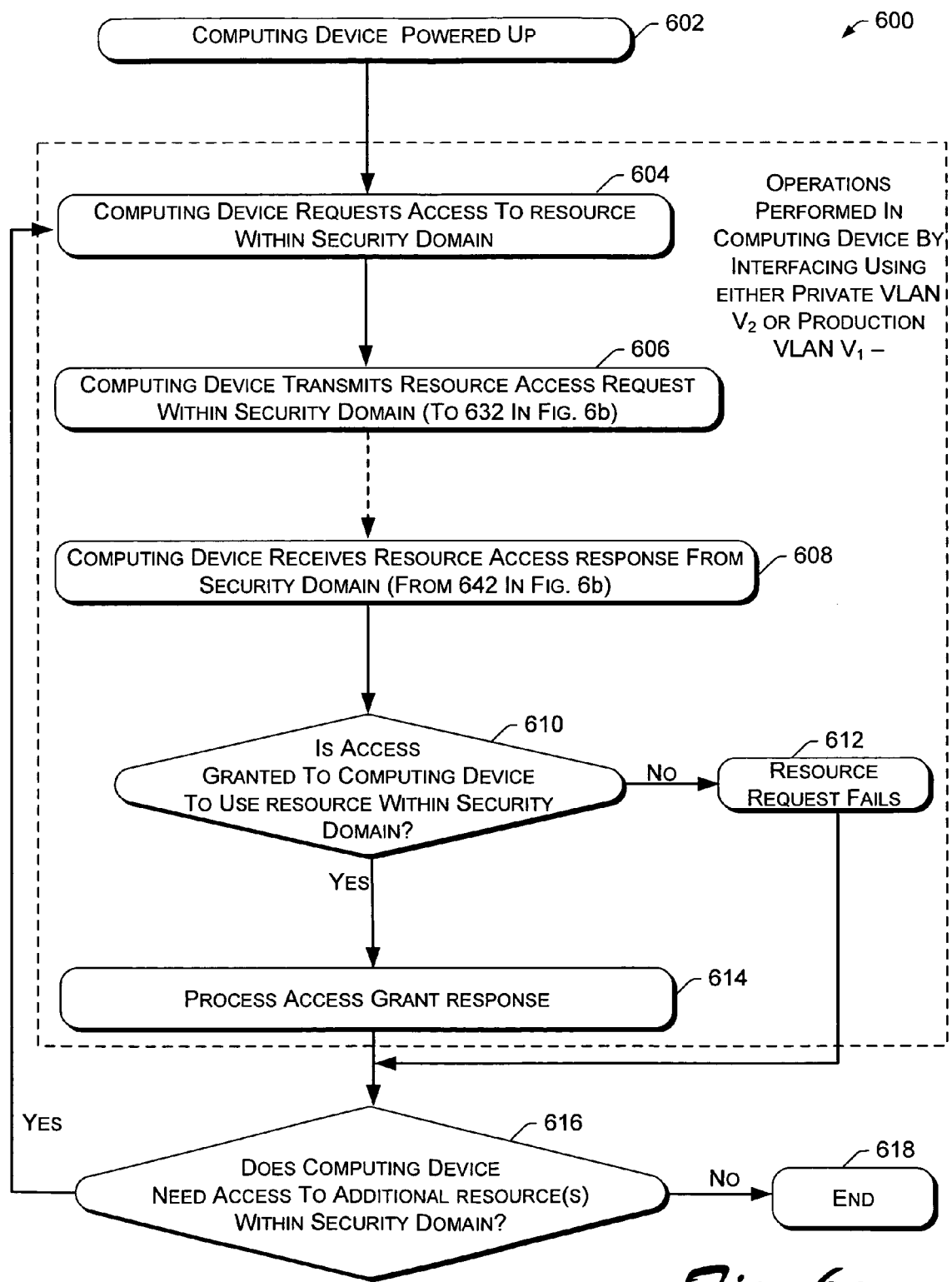
FIG. 6*a* is a flow diagram of one embodiment of a resource request as performed in a computing device in attempting to access a resource in a security domain.

Initially, in operation 602, the computing device is powered on as shown in FIG. 6a. After being powered on, the computing device requests access to a resource(s) that is contained within the security domain in operation 604. As the resource(s) is within the security domain, the resource(s) can also be referred to as a secure resource(s). Examples of such resources include an operating system, portions of an operating system, an application program(s), and so forth. Within the computing device authenticating process 600, some level of authentication from the security domain is optionally requested by the SIPA 106.

Process 600 continues to operation 606 in which the computing device transmits a resource access request to within the security domain. Following operation 606, the computing device waits for operation 608 in which the computing device receives the resource access response from the security domain. Between operations 606 and 608, the security domain authentication process 630 as described with respect to FIG. 6b is performing all of its operations and decisions 632, 634, 636, 638, 640, and/or 642.

Following the operation 608, the computing device authenticating process 600 continues to operation 610 in which the computing device determines whether the access is granted to the computing device to use the resource within the security domain. If the answer to the decision 610 is no, then the computing device authenticating process 600 continues to 612 in which the resource request fails and the security domain is not granting access to the requested resource. However, if the answer to the decision 610 is yes, then the computing device authentication process 600 succeeds and continues to operation 614 in which the computing device process the access grant response. Any of a wide variety of actions can be taken as part of this processing of operation 614, such as receiving the requested operating system or application from the security domain, communicating with devices in the security domain, and so forth.

After operation 612 or 614, the computing device authentication process 600 continues to the decision 616 in which the computing device determines whether to request access to an additional resource(s) within the security domain. If the answer to the determination in decision 616 is yes, that access to additional resource(s) should be requested, then process 600 returns to act 604 to request access to one of those additional resource(s). However, if the answer to the determination in decision 616 is no, that access to additional resource(s) should not be requested, then process 600 continues to operation 618 where process 600 ends.

Figure 6B:
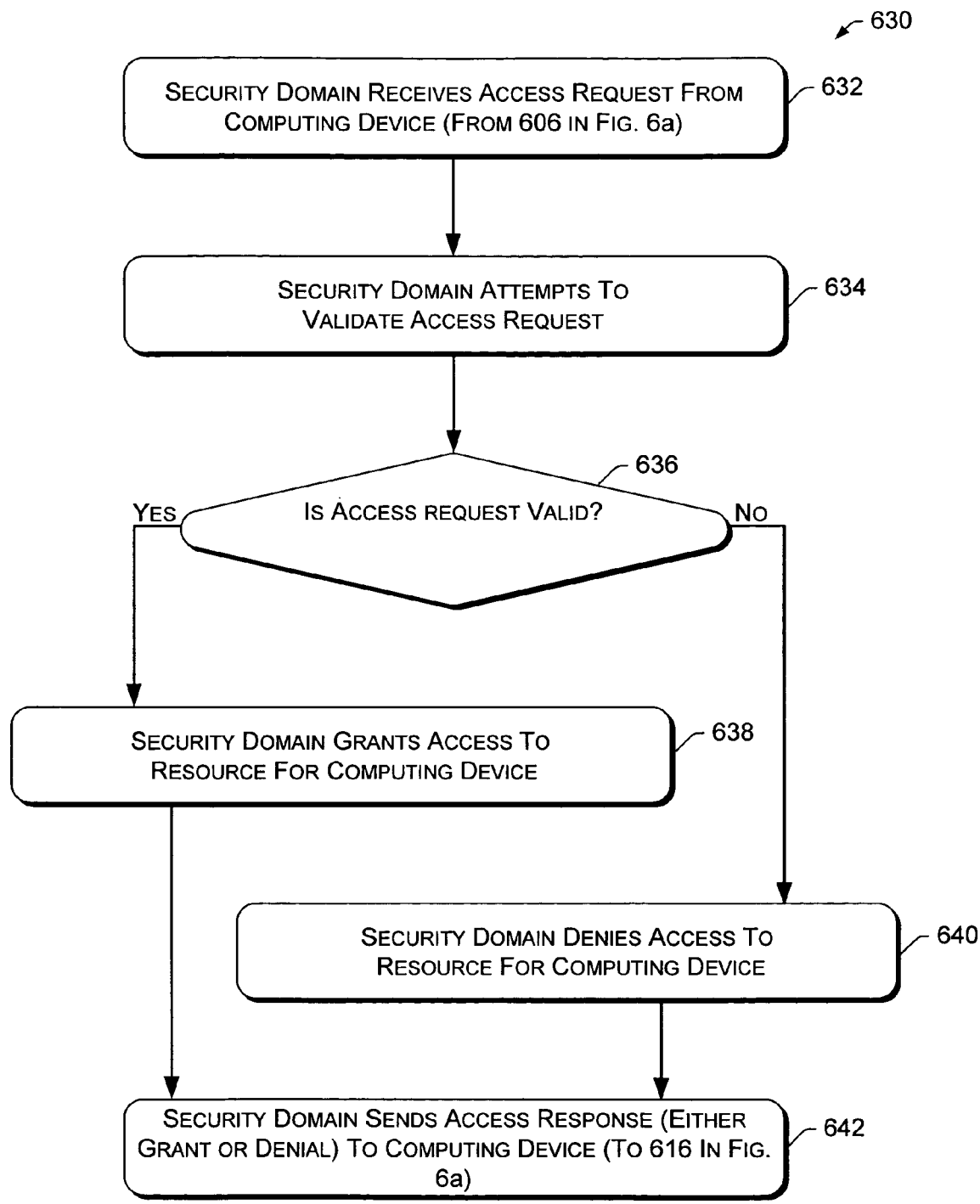
FIG. 6*b* is a flow diagram of one embodiment of a resource grant as is performed in a security domain in response to the resource request of FIG. 6*a*.

One embodiment of the security domain authentication process 630 that is described with respect to FIG. 6b describes one embodiment of the security domain authenticating a computing device to use a resource that is contained within the security domain. The security domain authenticating process 630 includes operation 632 in which the security domain receives an access request from the computing device, which has been described in operation 606 of the computing device authenticating process 600 of FIG. 6a. The security domain authenticating process 630 continues to operation 634 in which the security domain attempts to validate the access request. In certain embodiments, the security domain attempts to validate the access request based on the persistent identity within the SIPA 106 of the computing device from which the request is received.

The security domain authenticating process 630 continues to decision 636 in which it is determined whether the access request is valid. If the answer to the decision 636 is yes, then the security domain authenticating process 630 continues to operation 638 in which the security domain grants access to the resource for the computing device. Following the operation 638, the security domain sends a grant access response to the computing device, which is received in the operation 608 of the computing device authenticating process 600 of FIG. 6a.

However, if the answer to the decision 636 is no, then the security domain authenticating process 630 continues to operation 640 in which the security domain denies access to the resource for the computing device. Following the operation 640, the security domain sends a deny access response to the computing device, which is received in the operation 608 of the computing device authenticating process 600 of FIG. 6a.

It should be noted that, with respect to process 630 of FIG. 6b, validating an access request may involve operations from one or more devices within the security domain 104 of FIGS. 1 and 2. Additionally, in certain embodiments the device(s) within the security domain 104 can process multiple access requests concurrently, whether the multiple access requests are from the same or different computing devices 105.

FIGS. 6a and 6b discuss access to resources. It should be noted that access to a particular resource can be predicated on obtaining access to one or more other resources. Examples of such situations are discussed in additional detail below with reference to FIGS. 8a, 8b, 9a, 9b, 9c, 10a, 10b, and 11. Alternatively, access to a particular resource can be independent of access to any other resource. For example access to a first restricted VLAN may be independent of access to a second restricted VLAN.

Figure 7:
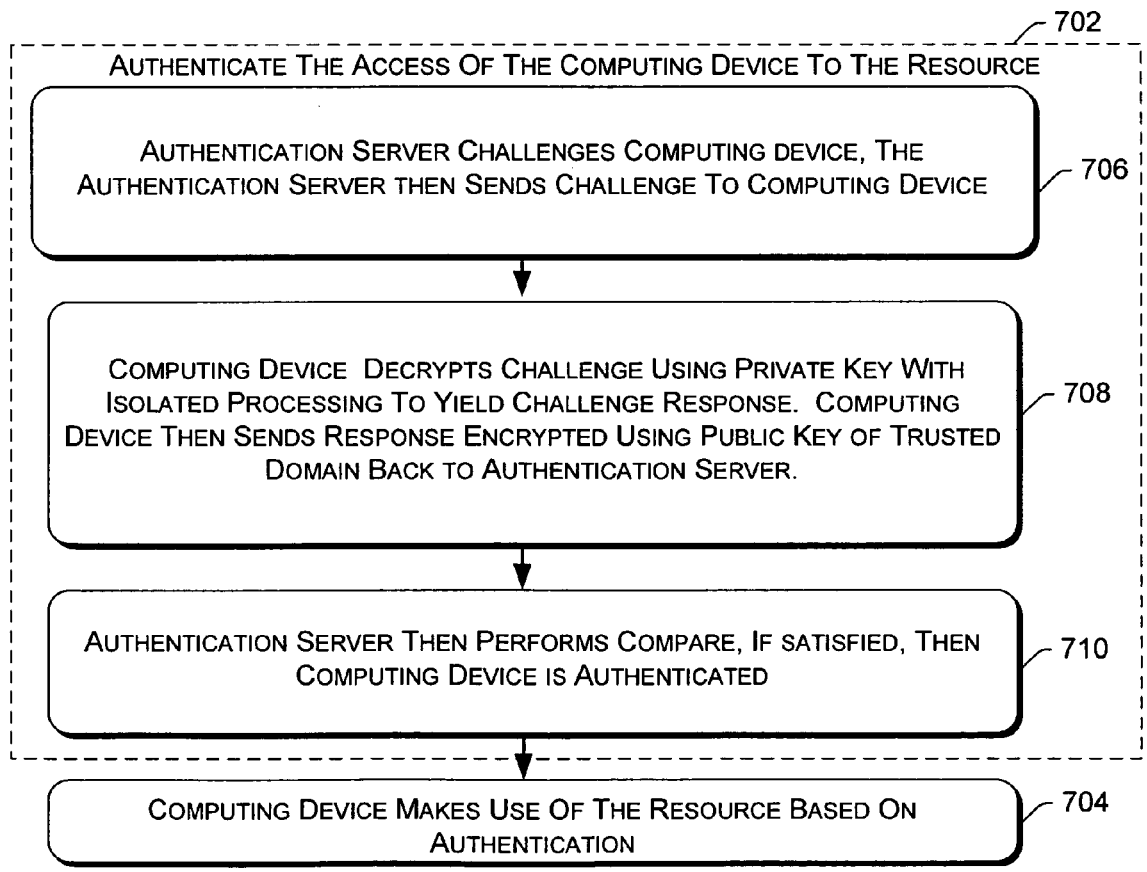
FIG. 7 is a flow diagram of one embodiment of authentication challenge technique.

FIG. 7 shows one embodiment of a challenge technique 700 that the authentication server 108 of the security domain 104 uses to challenge the identity of the computing device 105 including a SIPA 106 as described with respect to FIGS. 1 and 2. The challenge technique 700 includes operation 702 in which the access of the computing device is authenticated with respect to the resource of the security domain, and operation 704 in which the computing device makes use of the resource of the security domain based on the authentication.

In one embodiment, operation 702 includes operations 706, 708, and 710. In operation 706, the authentication server challenges the computing device 105. In the challenge, the authentication server generates random challenge information (e.g., a random number), and encrypts the random challenge information with the public key of the computing device 105 to produce the challenge. The public key of the computing device 105 is contained in the computing device public certificate. The authentication server then sends the challenge to the computing device.

In operation 708, the cryptographic processor 150 of the computing device 105 decrypts the challenge using its private key 157 contained in the isolated storage portion 152 of the SIPA as shown in FIG. 13 to yield a challenge response. The challenge response is derived by decrypting the challenge using the private key 157 of the computing device 105, and then extracting the random challenge information. The random challenge information is then re-encrypted by the cryptographic processor 150 using the public key of the authentication server (e.g., as contained in the trusted domain public certificate 156 of FIG. 13) to form the challenge response. The computing device 105 then sends the response that is encrypted using the public certificate of the trusted domain back to the authentication server.

In operation 710, the authentication server then performs a compare by decrypting the challenge response using the private key of the authentication server. The challenge information from the decrypted challenge response is then compared to the original random challenge information as sent in operation 706. If the original random challenge information and the challenge information from the decrypted challenge response are the same, then the computing device is authenticated. The authentication server assumes that only the computing device, which knows the private key of the computing device, would have been able to decrypt the challenge sent in operation 706 and extract the random challenge information from the challenge. This allows the computing device to make use of the requested resource in operation 704.

Figure 11:
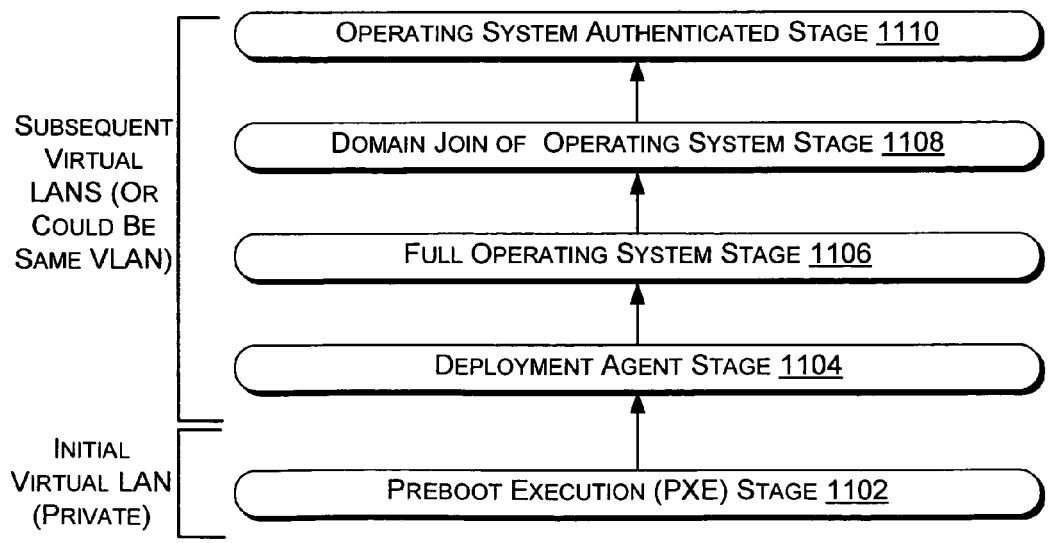
FIG. 11 is a diagram of one embodiment of the authentication levels relative to a security domain that may be attained by a computing device containing the SIPA.

FIG. 11 is a diagram of one embodiment of the authentication levels or stages relative to a security domain that may be attained by a computing device containing the SIPA. Each level or stage illustrated in FIG. 11 represents access to a particular resource that is predicated on access to the resource in the previous level or stage.

The first level or stage in the example of FIG. 11 is a PXE stage 1102. The PXE stage 1102 is carried out using an initial private VLAN $V_2$ as described with respect to FIG. 2. The next level or stage is the deployment agent stage 1104, followed by the full operating system stage 1106, followed by the domain join of operating system stage 1108, and finally the operating system authentication stage 1110. The higher the level obtained in FIG. 11 (e.g., by obtaining a higher level of operating system), the greater the level of authentication of the computing device with respect to the security domain. Each of the levels or stages 1104 through 1110 can be performed in the same VLAN, such as production VLAN $V_1$ described with respect to FIG. 2, or one or more other VLANs.

Example Staging Area Scenario

Figure 8A:
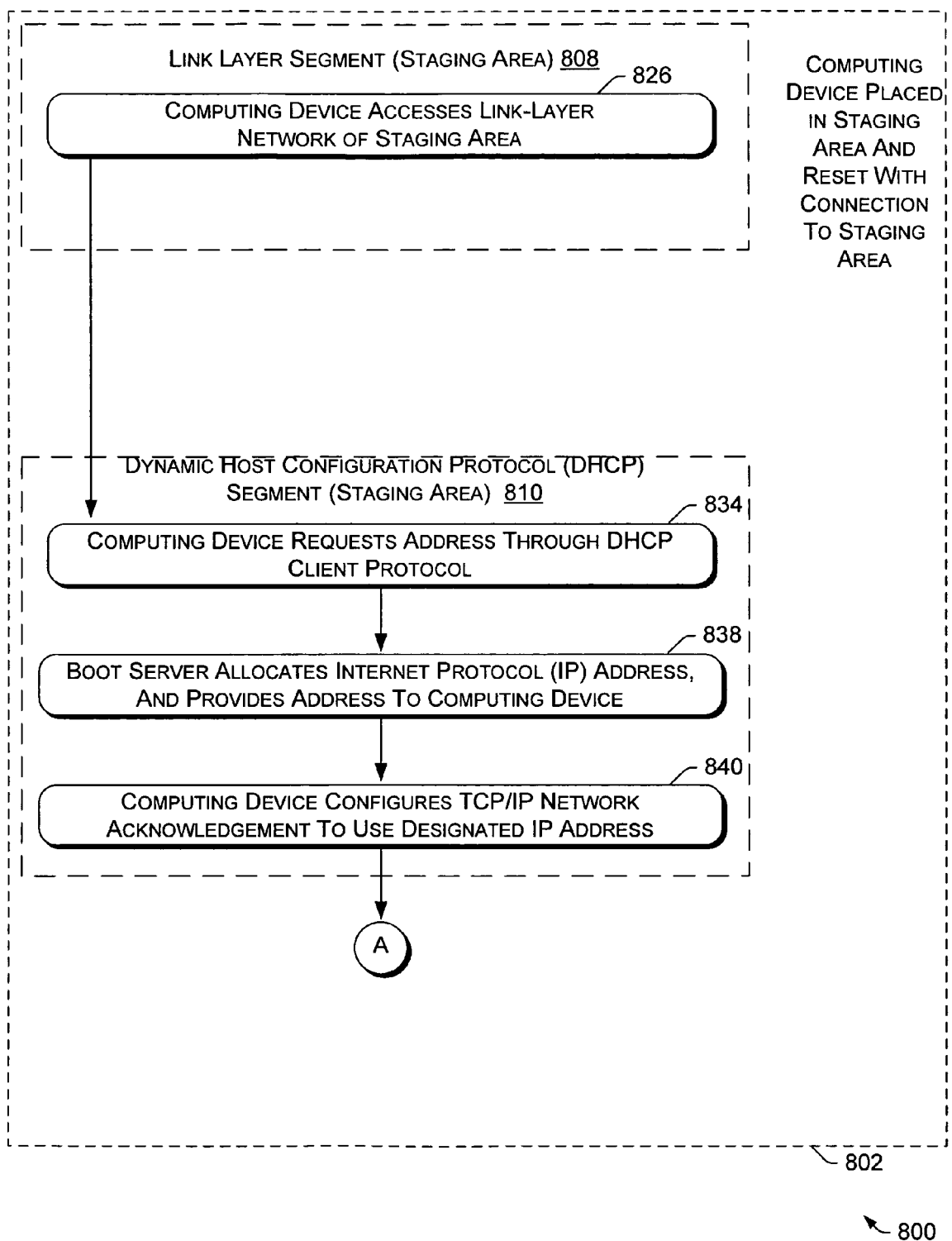
FIGS. 8*a* and 8*b* are a flow diagram of one embodiment of a computing device authentication technique that is performed in a staging area.
Figure 8B:
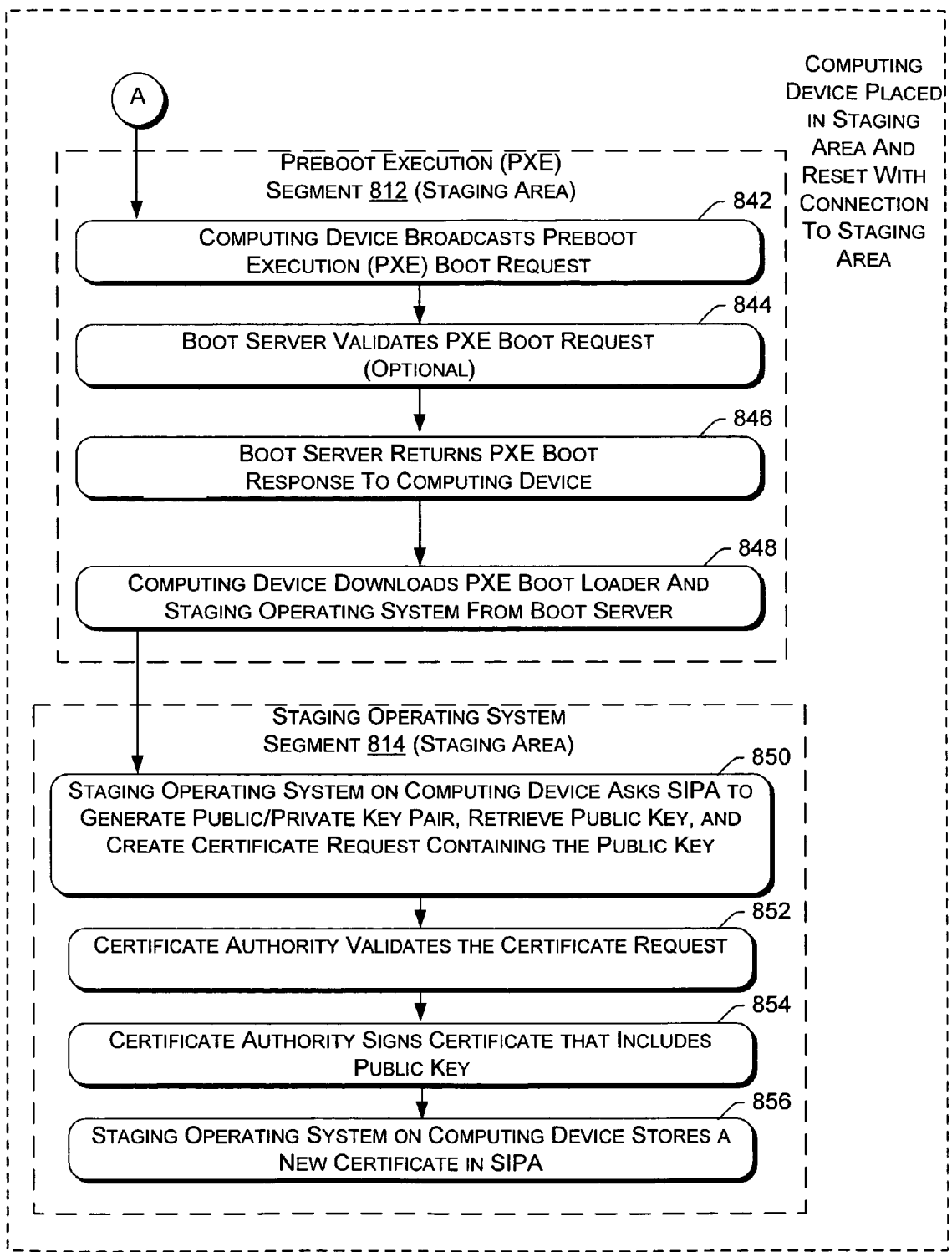

One embodiment of a computing device technique that involves the staging area 120 is described with respect to FIGS. 8a and 8b. The process for the computing device within the secure data center 102 involves applying the computing devices 105, prior to placing the devices 105 in the production area 103, to the staging area 120 using a staging area flow diagram 800 as described relative to FIGS. 8a and 8b.

In the staging area flow diagram 800 as described in FIGS. 8a and 8b, the computing device 105 is physically moved into the staging area. In one embodiment, the staging area operator may at their discretion cause the SIPA cryptographic processor 150 to regenerate the public/private key pair for the SIPA 106. The staging area 120 allows for a persistent identity of the computing device to obtain key information without any human intervention by a trusted human. Such human intervention in conventional systems may take the form of the human providing a shared secret, such as occurs in smart cards. Alternatively, the human intervention would take the form of the human manually inputting key information (that is used to generate the key pair 158 that is contained in the persistent identity 154 as shown in FIG. 2) by, for example, typing in the key information on a keyboard. While private keys and public keys are represented extremely long numbers, the key information that is considerably shorter such as input from a trusted human can be used to generate the keys.

By reducing the human intervention by a trusted human when the computing device is in the staging area, the process of providing the keys to the security domain is largely automated.

One embodiment of the staging area flow diagram 800 includes a link layer segment 808, a dynamic host configuration protocol (DHCP) segment 810, a preboot execution (PXE) segment 812, and a staging operating system segment 814. The segments 808, 810, 812, and 814 occur within the staging area 120 to provide a key pair to the computing device 105 with respect to the security domain 104 of FIGS. 1 and 2. In one scenario, a human carries a computing device into the staging area. At this point, the computing device does not contain any keys in its persistent identity. For instance, an owner of a new computing device would insert the computing device into a slot of a dedicated chassis (not shown), with the chassis wired to the staging area in a manner that reduces network-based threats. In this configuration, the computing device can access servers (e.g., the authentication server 108 and the boot server 116 as shown in FIGS. 3 and 4) that are located within the security domain. Upon insertion of the computing device into the staging area, the computing device is powered and then a physical mechanism automatically closes a reset switch whereby the SIPA generates a key pair.

The link layer segment 808 occurs within the staging area 120 of FIG. 1 at the link-layer level. The resource for which access is being requested in link layer segment 808 is the staging VLAN. In the link layer segment 808 of FIG. 8a, the computing device accesses a link-layer physical network of the staging area in operation 826.

Following the link layer segment 808, the staging area flow diagram 800 continues to the DHCP segment 810 that applies at the DHCP level. The resource for which access is being requested in DHCP segment 810 is an Internet Protocol (IP) address. The DHCP segment 810 includes operation 834 in which the computing device requests an address through the DHCP client protocol. In operation 838 of the DHCP operation 810, the boot server allocates the Internet Protocol (IP) address, and provides the address to the computing device. In operation 840, the computing device configures the TCP/IP network to use the designated IP address.

The preboot execution (PXE) segment 812 involves interfacing with the staging area at the PXE level. The resource for which access is being requested in PXE segment 812 is a PXE boot loader and staging operating system. The preboot execution (PXE) segment 812 includes operation 842 in which the computing device broadcasts the preboot execution boot request. In optional operation 844, the boot server validates the PXE boot request. The preboot execution (PXE) operation 812 continues to 846 in which the boot server returns the PXE boot response to the computing device. In operation 848, the computing device downloads the PXE boot loader and the staging operating system from the boot server.

The staging operating system segment 814 generates a certificate, signed by a certificate authority, containing a public key of the computing device. The resource for which access is being requested in staging operating system segment 814 is a certificate containing a public key of the computing device. In operation 850 of the staging operating system segment 814, the staging operating system of the computing device asks the SIPA to generate a public/private key pair, retrieve the public key from the SIPA, Rand create a certificate request that will be sent to a certificate authority, perhaps using an industry standard format such as Public-Key Cryptography Standard #10 (PKCS#10). In operation 852, the certificate authority 110 as shown in FIG. 2 which is connected to the staging area validates the certificate request. In operation 854, the certificate authority 110 signs the certificate that includes the SIPA public key. In operation 856, the staging operating system on the computing device stores the new certificate in the SIPA. The computing device may also receive the public certificate of the security domain.

It should be noted that various validation operations are discussed in the flow diagram 800, such as operations 828, 844, and 852. These discussions assume that the various validation operations are successful. However, if any of the validations are unsuccessful (e.g., in operation 828 the switch determines that access to the network port is not valid), then the process of flow diagram 800 stops, and no new certificate will end up being stored in the SIPA (in operation 856 of FIG. 8b).

Example Production Area Booting Scenarios

After the computing device 105 is enrolled within the staging area 120 of FIG. 2 as discussed above, the computing device 105 is placed in the production area 103 of FIG. 1. The production area 103 can also be referred to as the production network. The computing device 105 can be authenticated and have an operating system installed thereon as described relative to FIGS. 9a, 9b, and 9c. In the production area booting scenario or process 900, the potential for network-based threats exist. The production area can be distinguished from the staging area since the staging area is a place where threats typically do not exist; while the production area uses a network where threats are assumed to exist but are not known.

When the computing device 105 exits the staging area, it contains the identity of the SIPA 106, but not necessarily any other state or operating system. The computing device is then placed in the production area 103 and coupled to a network switch 109. When the computing device 105 is coupled to network switch 109 and powered up, booting process 900 as described relative to FIGS. 9a to 9c begins. Booting process 900 may also be performed in response to a hardware or software reset of the computing device 105, or when the computing device 105 is resuming operation from a standby, hibernation, or other power-saving mode.

One embodiment of the production area booting process 900 includes a link layer authentication segment 904, a dynamic host configuration protocol (DHCP) authentication segment 906, a preboot execution (PXE) authentication segment 907, a deployment operating system authentication segment 908, and a staging operating system authentication segment 910. Each of the access requests in segments 904, 906, 907, 908, and 910 can be authenticated as discussed above with respect to FIGS. 6a and 6b.

The link layer authentication segment 904 authenticates the computing device within the production network at the link-layer level. The resource for which access is being requested in link layer authentication segment 904 is the unrestricted production VLAN. In the link layer authentication segment 904 of FIG. 9a, the computing device accesses a link-layer physical network of the production network in operation 914. In operation 916, the switch determines that the access to the network port is valid. In operation 918, the switch enables the network port and the switch connects to the unrestricted production VLAN (e.g., VLAN network $V_2$ of FIG. 2). In operation 920, the computing device 105 completes the configuration of the link layer network interface.

The DHCP authentication segment 906 authenticates the computing device within the production network at the DHCP level. The resource for which access is being requested in DHCP authentication segment 906 is an Internet Protocol (IP) address. The DHCP authentication segment 906 includes operation 922 in which the computing device requests an address through the DHCP client protocol. In operation 926 of the DHCP authentication segment 906, the boot server allocates the Internet Protocol (IP) address, and provides the address to the computing device. In operation 928, the computing device configures the TCP/IP network to use the designated IP address.

The preboot execution (PXE) authentication segment 907 authenticates the computing device within the production network at the PXE level. The resource for which access is being requested in PXE authentication segment 907 is a PXE boot loader and deployment operating system. The PXE authentication segment 907 includes operation 930 in which the computing device broadcasts the preboot execution boot request. In operation 932, the boot server validates the PXE boot request. The PXE authentication segment 907 continues to operation 934 in which the boot server returns the PXE boot response to the computing device. In 936, the computing device downloads the PXE boot loader and a staging operating system from the boot server.

The PXE bootstrap of segment 907 results in the computing device 105 booting an operating system image with the production area booting process 900. When the computing device boots without an operating system in a local store, a boot image is acquired from a network source within the security domain 104.

The deployment operating system authentication segment 908 authenticates the computing device within the production network at the deployment operating system level. The resource for which access is being requested in deployment operating system authentication segment 908 is a restricted production VLAN. In operation 938 of the deployment operating system authentication segment 908 in the production area booting scenario 900, the deployment operating system on the computing device creates an Extensible Authentication Protocol/Transport Level Security (EAT/TLS) request to join a restricted production virtual local area network (e.g., VLAN $V_1$), and sends the EAP/TLS request to the switch assembly. In operation 940 of the deployment operating system authentication segment 908, the switch 109 of FIG. 2 delivers the EAP/TLS request to the authentication server. The authentication server validates the computing device identity using public and private key challenge-response with the SIPA over the communication channel through the switch to the deployment operating system on the computing device. In operation 942 of the deployment operating system authentication segment 908, the computing device configures the virtual network adapter that is connected to the restricted production VLAN $V_1$, and then reboots. In operation 944 of the deployment operating system authentication segment 908, the deployment operating system on the computing device boots, and creates a request to join a production VLAN.

The production operating system authentication segment 910 of the production VLAN booting scenario 900 further authenticates the computing device with respect to the security domain. The resource for which access is being requested in production operating system authentication segment 910 is the security domain. The production operating system authentication segment 910 includes an operation 946 in which the production operating system on the computing device boots, and creates a request to join a production security domain. In operation 948, a security domain server validates the identity of the computing device via public/private key challenges and key response using the trusted domain public certificate that is stored on the SIPA. In operation 950 of the production operating system authentication segment 910, the security domain server returns the security domain logon credentials to the computing device. In operation 952 of the production operating system authentication segment 910, the production operating system reboots and uses the stored security domain logon credentials to access the restricted production security domain.

Figure 12:
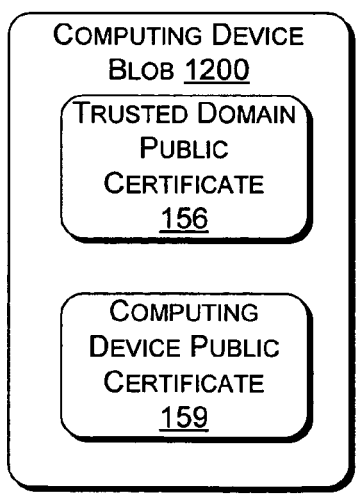
FIG. 12 is a block diagram of one embodiment of computing device blob.

When the computing device 105 downloads the operating system and the SIPA does not have the public certificates stored in its isolated storage portion 152, the automated deployment service 119 can send the encrypted binary computing device blob 1200 of FIG. 12 to the computing device 105. The computing device blob 1200 can be encrypted using the public key of the SIPA. The blob 1200 includes the computing device public certificate 159, as well as the trusted domain public certificate 156. In this case, the computing device 105 asks for a particular computing device blob 1200 by submitting its public key along with the request. The automated deployment service 119 will catalog the binary computing device blobs 1200 by public key and send the corresponding blob. If the computing device 105 is not a rogue, it will be able to decrypt the computing device blob

1200 using its private key in the SIPA. In this way, only the computing device 105 with the corresponding key pairs receives their public certificate. When it has decrypted the computing device blob 1200, the computing device 105 places the trusted domain public certificates 156 and the computing devices public certificate 159 as shown in FIG. 13 in the certificate store contained within persistent identity 154 of the isolated storage portion 152. In one embodiment, the authentication protocols described above also are applied for network access and security domain membership.

Figure 9A:
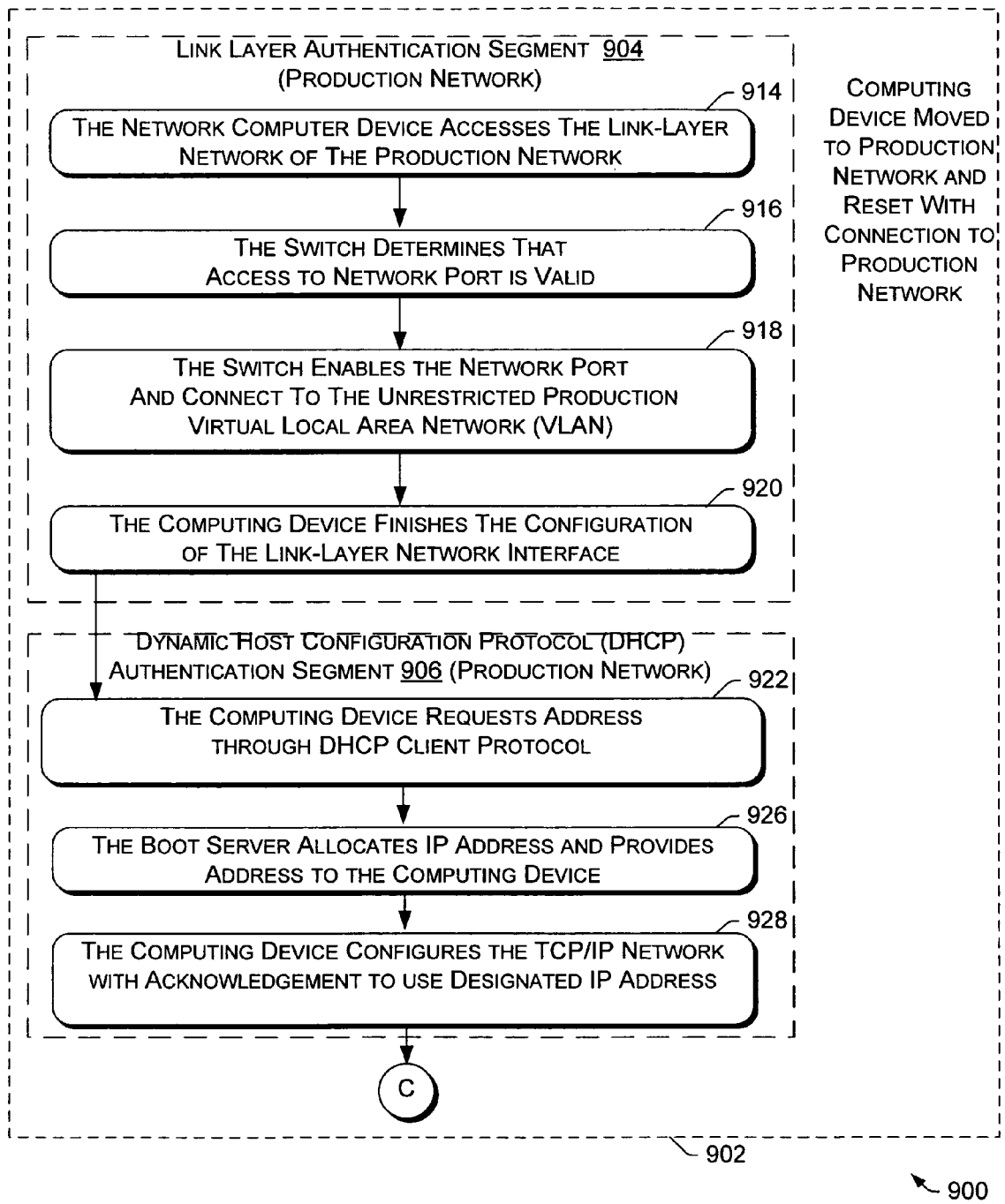
FIGS. 9*a*, 9*b*, and 9*c* are a flow diagram of one embodiment of a computing device authentication technique that is performed in a production network.
Figure 9B:
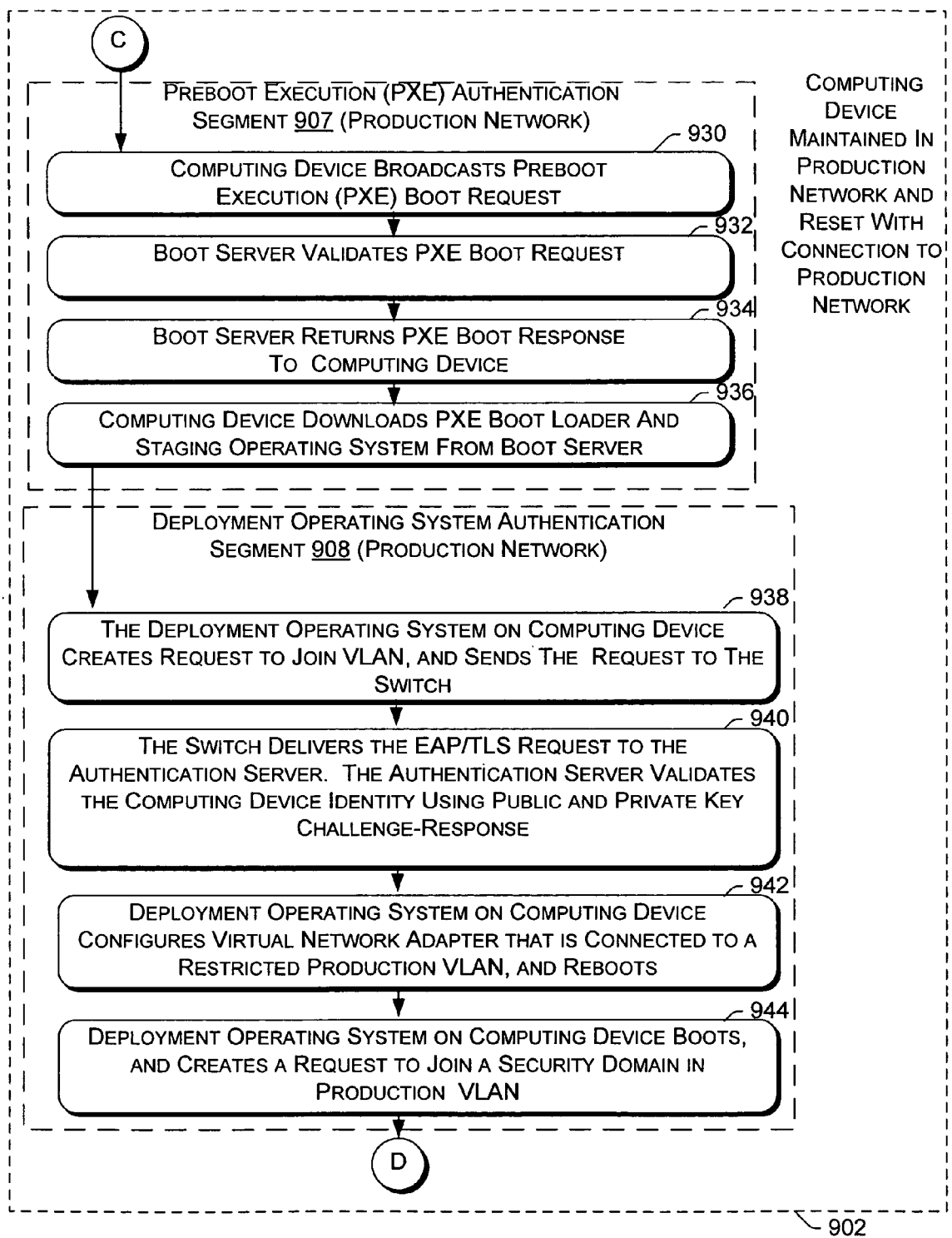
Figure 9C:
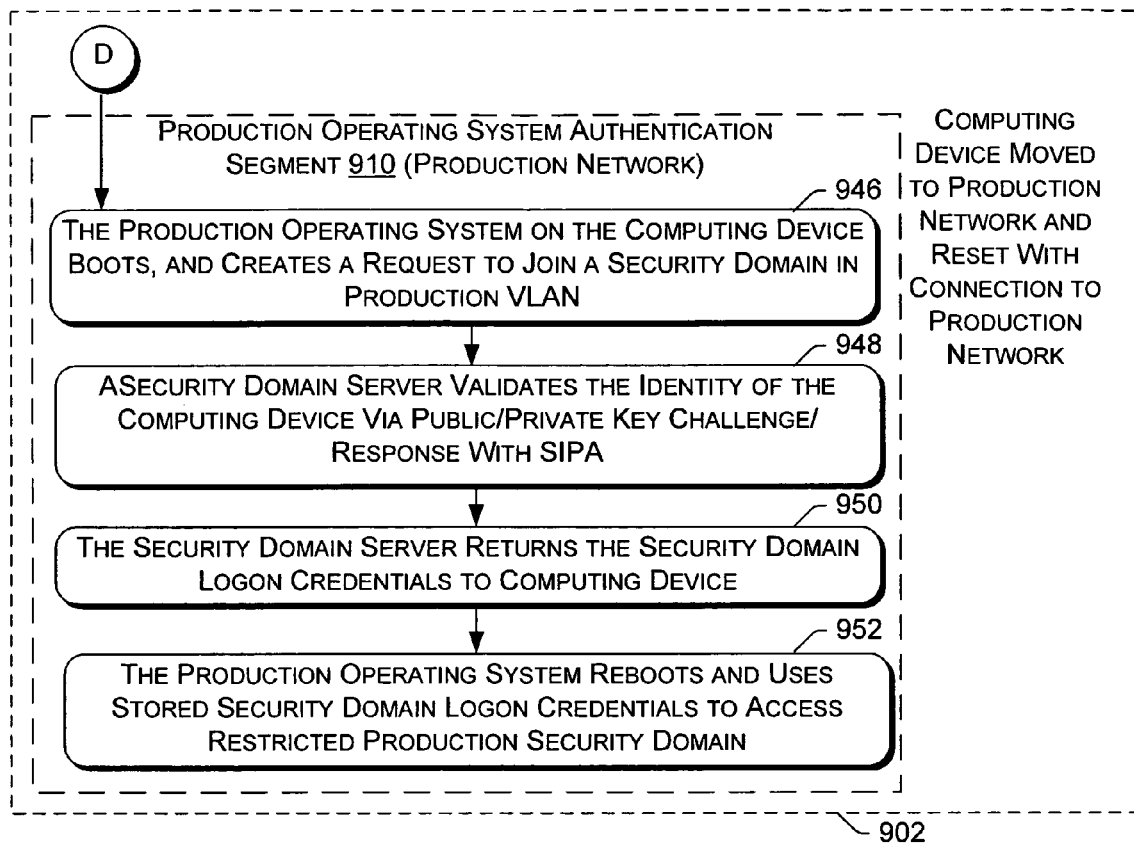

In the production area booting process 900 as described relative to FIGS. 9a to 9c, where the computing device 105 boots and acquires a boot image from the network, the computing device 105 uses an industry standard protocol such as PXE to broadcast "discovery" for a network identity and a network address. The network address and the network identity are used to download the first boot image. The network identity is set forth in the Dynamic Host Configuration Protocol (DHCP).

Figure 10A:
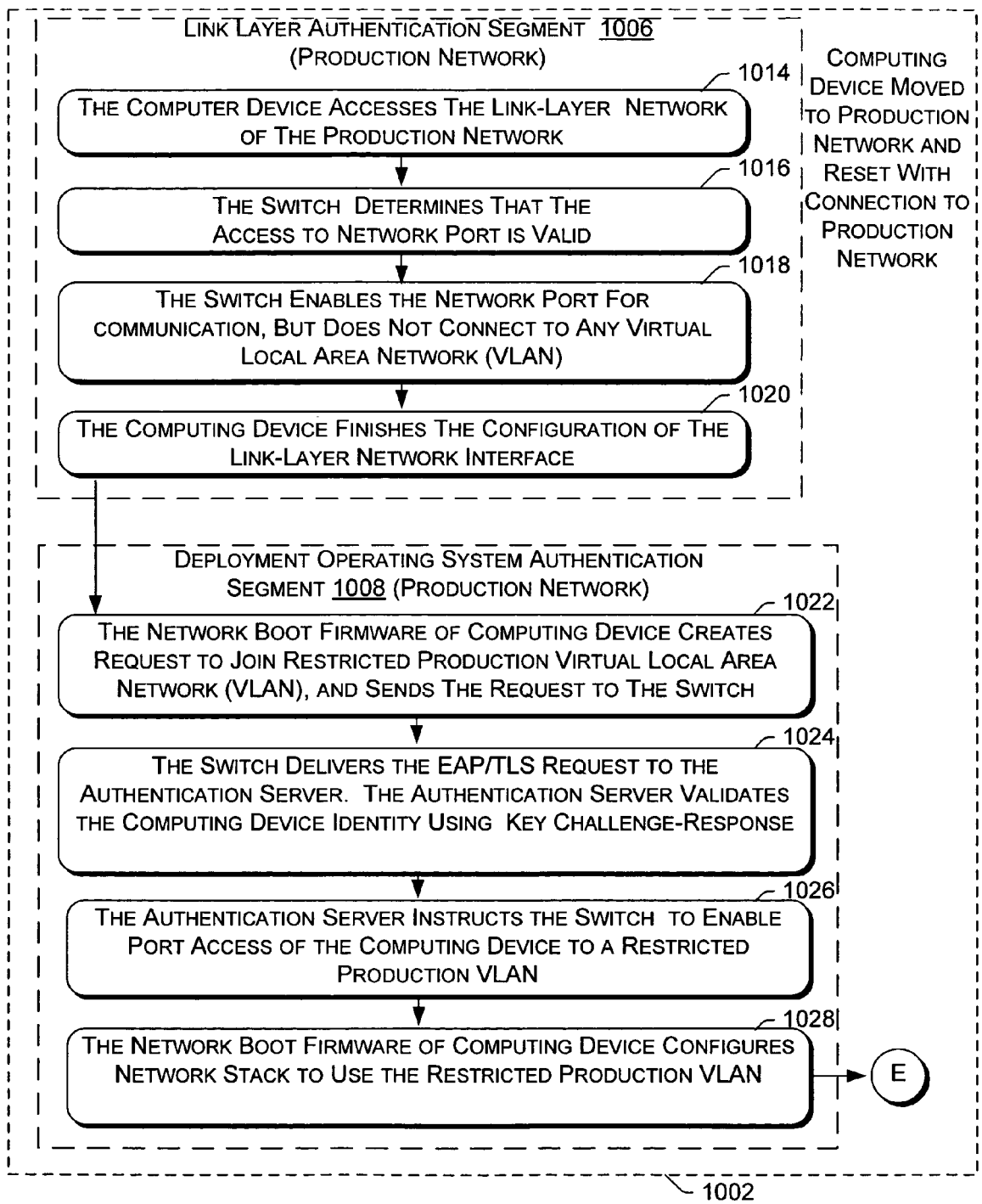
FIGS. 10*a* and 10*b* are a flow diagram of another embodiment of a computing device authentication technique that is performed in a production network.
Figure 10B:
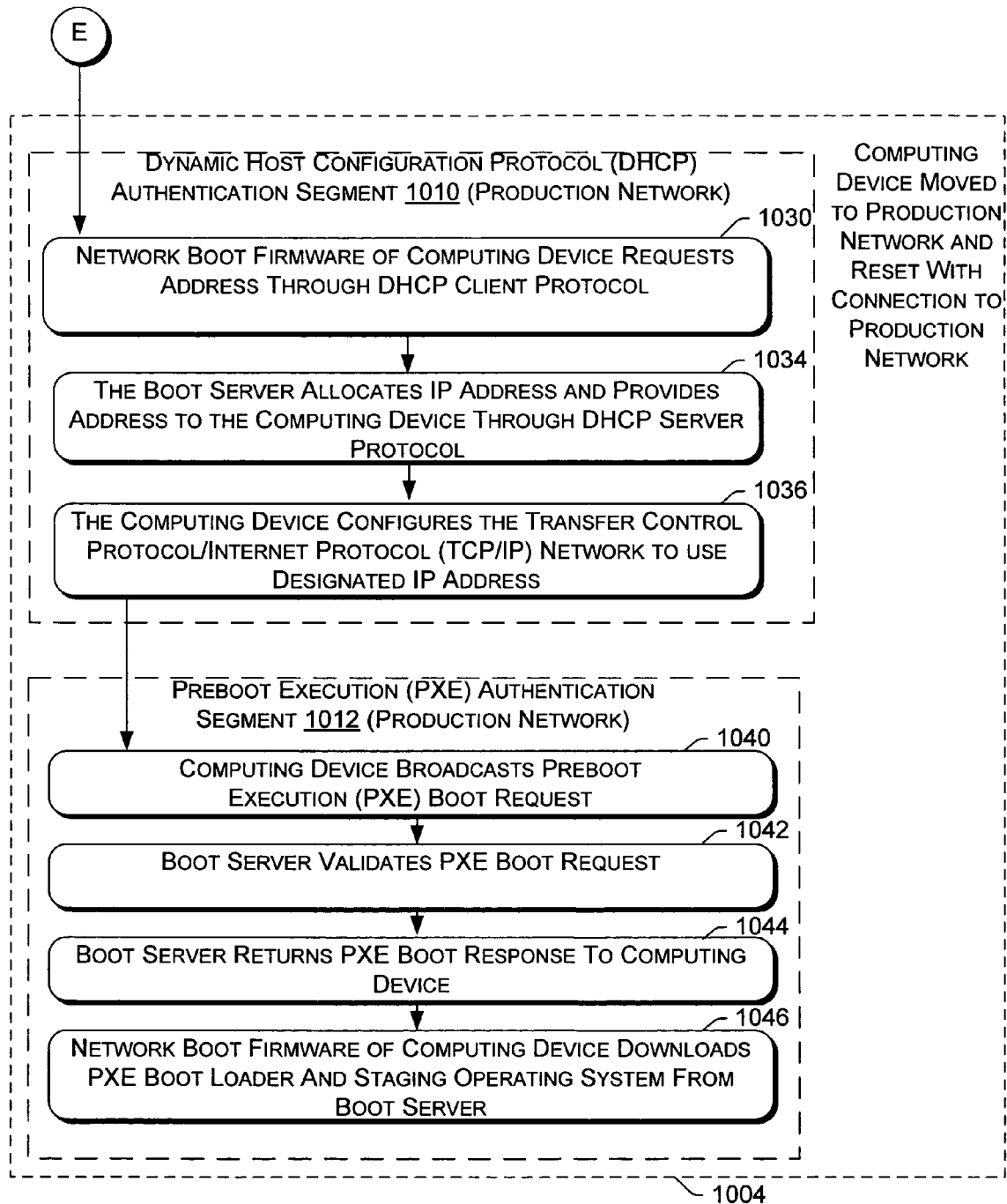

Another embodiment of the production VLAN booting scenario or process 1000 is described with respect to FIGS. 10a and 10b. Booting process 1000 of FIGS. 10a and 10b is similar to process 900 of FIGS. 9a to 9c, however, process 1000 differs from process 900 in that in process 1000 the SIPA is used to retrieve operating system software without using the unrestricted VLAN (e.g., VLAN $V_2$) as used in process 900. The production area booting process 1000 includes a link layer authentication segment 1006, a deployment operating system authentication segment 1008, a DHCP authentication segment 1010, and a PXE execution segment 1012. Each of the access requests in segments 1006, 1008, 1010, and 1012 can be authenticated as discussed above with respect to FIGS. 6a and 6b.

In the link layer authentication segment 1006 of FIG. 10a, the computing device accesses a link-layer physical network of the production network in operation 1014. The resource for which access is being requested in link layer authentication segment 1006 is the network port. In operation 1016, the switch determines that the access to the network port is valid. In operation 1018, the switch enables the network port for communication, but does not connect to any VLAN. In operation 1020, the computing device 105 completes the configuration of the link layer network interface.

The deployment operating system authentication segment 1008 authenticates the computing device within the production network at the deployment operating system level. The resource for which access is being requested in deployment operating system authentication segment 1008 is a restricted production VLAN. The deployment operating system authentication segment 1008 includes operation 1022 in which the network boot firmware of the computing device creates an Extensible Authentication Protocol/Transport Level Security (EAP/TLS) request to join a restricted production VLAN (e.g., VLAN $V_1$), and sends the EAP/TLS request to the switch. In operation 1024, the switch delivers the EAP/TLS request to the authentication server. The authentication server validates the computing device identity using public and private key challenge-response with the SIPA as shown in FIG. 7 over the communication channel through the switch to the network boot firmware on the computing device. In operation 1025, the authentication server instructs the switch to enable port access of the computing device to the restricted production VLAN. In operation 1028, the network boot firmware of the computing device configures the network stack to use the restricted production VLAN.

The DHCP authentication segment 1010 authenticates the computing device within the production network at the DHCP level. The resource for which access is being requested in DHCP authentication segment 1010 is an IP address. The DHCP authentication segment 1010 includes operation 1030 in which the networked boot firmware of the computing device requests an address through the DHCP client protocol. In operation 1034 of the DHCP authentication segment 1010, the boot server allocates the IP address, and provides the address to the computing device. In operation 1036, the computing device configures the TCP/IP network to use the designated IP address.

The PXE authentication segment 1012 authenticates the computing device within the production network at the PXE level. The resource for which access is being requested in PXE authentication segment 1012 is a PXE boot loader and operating system. The PXE authentication segment 1012 includes operation 1040 in which the computing device broadcasts the preboot execution boot request. In operation 1042, the boot server validates the PXE boot request. The PXE authentication segment 1012 continues to operation 1044 in which the boot server returns the PXE boot response to the computing device. In operation 1046, the computing device downloads the PXE boot loader and a staging operating system from the boot server.

The PXE bootstrap of the PXE authentication segment 1012 results in the computing device 105 booting an operating system image with the production area booting process 1000. When the computing device boots without an operating system, a boot image is acquired from a network source within the security domain 104.

A SIPA solution includes system software and in one embodiment, operating system programmers generally refer to drivers as a software layer that works between hardware and the operating system. An operating system may include authentication services or it may be considered a supplemental package of software. In either embodiment, standard authentication software generally needs to be interfaced to the operating system and is typically either the driver mentioned earlier or to a software API layer operating system dependent. In one embodiment this additional software layer is called a cryptographic software provider (CSP). A SIPA CSP provides communication between the SIPA driver and all services above including authentication services for network access and security domain membership join authentication.

CONCLUSION

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media." "Computer storage media" includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as career wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
  acquiring security domain access credentials on a computing device by:
    storing a persistent identity on the computing device,
    deriving data that includes the security domain access credentials from the persistent identity, and
    transferring the derived data to a security domain to allow the computing device to join the security domain;
  wherein the persistent identity is stored in a secure identity processing area (SIPA), and wherein the SIPA is located in the computing device;
  wherein a trust relationship that allows a secure domain join of the computing device to the security domain is established between a persistent account stored in a security domain and the persistent identity in the SIPA;
  wherein the SIPA and a secure data center allow the computing device to obtain a cryptographically authenticated operating system at least partially in response to the security domain access credentials.

2. The method of claim 1, wherein an operating system of the computing device receives the derived data by communicating with a processor that is located within the SIPA.

3. The method of claim 1, wherein an operating system of the computing system establishes an identity of the computing device to the security domain at least partially in response to the security domain access credentials.

4. The method of claim 1, further comprising at least one operating system executing on the computing device, wherein an identity of the operating system is generated based on the persistent identity.

5. The method of claim 1, wherein the data derived from the persistent identity includes a cryptographic function, and wherein the persistent identity challenges security domain data received from the security domain.

6. The method of claim 5, wherein the data derived from the persistent identity includes data encrypted with a public key that is associated with the persistent identity and the cryptographic functions include decrypting a portion of the challenge data with a private key of the persistent identity.

7. The method of claim 1, further comprising at least one operating system executing on the computing device, wherein the operating system contains an identity associated with the operating system, and wherein the identity is established in a computer account that is contained in the security domain.

8. An apparatus comprising:
  a computing device configured to acquire security domain access credentials, wherein the computing device stores a persistent identity, further wherein the computing device derives data that includes the security domain access credentials from the persistent identity, further wherein the computing device transfers the derived data to a security domain that allows the computing device to join the security domain;
  wherein a secure identity processing area (SIPA) stores the persistent identity, wherein the SIPA is located in the computing device;
  wherein the SIPA and the secure data center allow the computing device to obtain a cryptographically authenticated operating system at least partially in response to the security domain access credentials.

9. The apparatus of claim 8, wherein a trust relationship that allows a secure domain join of the computing device to the security domain is established between a persistent account stored in a security domain and the persistent identity in the SIPA.

10. The apparatus of claim 8, wherein an operating system of the computing device receives the derived data by communicating with a processor that is located within the SIPA.

11. The apparatus of claim 8, wherein an operating system of the computing system establishes an identity of the computing device to the security domain at least partially in response to the security domain access credentials.

12. The apparatus of claim 8, further comprising at least one operating system executing on the computing device, wherein an identity of the operating system is generated based on the persistent identity of the SIPA.

13. The apparatus of claim 8, wherein the data derived from the persistent identity includes a cryptographic function, and wherein the persistent identity challenges security domain data received from the security domain.

14. The apparatus of claim 13, wherein the data derived from the persistent identity includes data encrypted with a public key that is associated with the persistent identity and the cryptographic functions include decrypting a portion of the challenge data with a private key of the persistent identity.

15. The apparatus of claim 8, further comprising at least one operating system executing on the computing device, wherein the operating system contains an identity associated with the operating system, and wherein the identity is established in a computer account that is contained in the security domain.

* * * * *